United States Patent
Reddy et al.

(10) Patent No.: US 10,038,742 B2
(45) Date of Patent: Jul. 31, 2018

(54) METHODS AND APPARATUS TO RETIRE HOSTS IN VIRTUAL SERVER RACK DEPLOYMENTS FOR VIRTUAL COMPUTING ENVIRONMENTS

(71) Applicant: VMware, Inc., Palo Alto, CA (US)

(72) Inventors: Thirumalesh Reddy, San Jose, CA (US); Raj Yavatkar, Saratoga, CA (US); Sreekantha Reddy Indireddy, Cupertino, CA (US); Shreekanth Ankala, Dublin, CA (US)

(73) Assignee: VMware, Inc., Palo Alto, CA (US)

( * ) Notice: Subject to any disclaimer, the term of this patent is extended or adjusted under 35 U.S.C. 154(b) by 387 days.

(21) Appl. No.: 14/788,193

(22) Filed: Jun. 30, 2015

(65) Prior Publication Data
US 2016/0013992 A1    Jan. 14, 2016

Related U.S. Application Data

(60) Provisional application No. 62/023,813, filed on Jul. 11, 2014.

(51) Int. Cl.
*G06F 15/173* (2006.01)
*H04L 29/08* (2006.01)
(Continued)

(52) U.S. Cl.
CPC ............ *H04L 67/10* (2013.01); *G06F 9/4416* (2013.01); *G06F 9/45558* (2013.01);
(Continued)

(58) Field of Classification Search
CPC ............ H04L 41/0893; H04L 41/0806; H04L 41/5025; H04L 47/822; H04L 43/065;
(Continued)

(56) References Cited

U.S. PATENT DOCUMENTS 7,389,300 B1    6/2008    Shah et al.
7,574,491 B2    8/2009    Stein et al.
(Continued)

FOREIGN PATENT DOCUMENTS

EP    1521172    4/2005

OTHER PUBLICATIONS

United States Patent and Trademark Office, "Non-Final Office Action," issued in connection with U.S. Appl. No. 14/796,803, dated Feb. 22, 2017, 42 pages.
(Continued)

*Primary Examiner* — Liangche A Wang
*Assistant Examiner* — Johnny Aguiar
(74) *Attorney, Agent, or Firm* — Hanley, Flight & Zimmerman, LLC

(57) ABSTRACT

Methods, apparatus and articles of manufacture are disclosed to retire hosts in virtual server rack deployments for virtual computing environments. An example method includes determining, via a processor, a workload associated with a physical host in a virtualized rack in response to a request to retire the physical host, the workload implemented by a virtual computing environment including the virtualized rack. The example method also includes determining, via the processor, a projected impact of retiring the physical host on the workload. The example method also includes presenting information representative of the projected impact.

22 Claims, 10 Drawing Sheets

(51) Int. Cl.
*G06F 9/455* (2018.01)
*H04L 12/46* (2006.01)
*H04L 12/24* (2006.01)
*G06F 9/4401* (2018.01)
*H04L 29/06* (2006.01)
*G06F 9/50* (2006.01)
*H04L 29/12* (2006.01)
*H04L 12/26* (2006.01)

(52) U.S. Cl.
CPC ........ *G06F 9/5077* (2013.01); *H04L 12/4675* (2013.01); *H04L 41/048* (2013.01); *H04L 41/0806* (2013.01); *H04L 41/0893* (2013.01); *H04L 41/5096* (2013.01); *H04L 67/38* (2013.01); *G06F 2009/45595* (2013.01); *H04L 41/0266* (2013.01); *H04L 41/0681* (2013.01); *H04L 41/082* (2013.01); *H04L 41/5038* (2013.01); *H04L 43/0817* (2013.01); *H04L 43/0852* (2013.01); *H04L 43/0876* (2013.01); *H04L 43/10* (2013.01); *H04L 61/2015* (2013.01); *H04L 61/2076* (2013.01)

(58) Field of Classification Search
CPC ............. H04L 41/5038; H04L 43/0817; H04L 43/0876; H04L 12/4675; H04L 41/145; H04L 41/147; H04L 43/16; H04L 41/5009; G06F 9/5077; G06F 9/45533; G06F 2209/5019
USPC .............................. 709/223, 224, 226; 718/1
See application file for complete search history.

(56) References Cited

U.S. PATENT DOCUMENTS

| | | | |
|---|---|---|---|
| 8,689,054 B1 | 4/2014 | van der Goot | |
| 8,997,098 B2 | 3/2015 | Lee et al. | |
| 9,176,764 B1 | 11/2015 | Jorgensen | |
| 2001/0029605 A1 | 10/2001 | Forbes et al. | |
| 2003/0204603 A1 | 10/2003 | Buchanan et al. | |
| 2004/0187103 A1 | 9/2004 | Wickham et al. | |
| 2005/0027843 A1 | 2/2005 | Bozak et al. | |
| 2005/0044220 A1 | 2/2005 | Madhavan | |
| 2006/0156041 A1 | 7/2006 | Zaretsky et al. | |
| 2006/0184349 A1 | 8/2006 | Goud et al. | |
| 2007/0027973 A1 | 2/2007 | Stein et al. | |
| 2008/0201705 A1 | 8/2008 | Wookey | |
| 2009/0249284 A1 | 10/2009 | Antosz et al. | |
| 2009/0249354 A1* | 10/2009 | Yamaguchi | G06F 9/485 718/106 |
| 2009/0290501 A1 | 11/2009 | Levy et al. | |
| 2009/0328030 A1 | 12/2009 | Fries | |
| 2010/0042723 A1 | 2/2010 | Sundarrajan et al. | |
| 2010/0070784 A1* | 3/2010 | Gupta | G06F 1/3203 713/310 |
| 2010/0106813 A1 | 4/2010 | Voutilainen et al. | |
| 2010/0114826 A1 | 5/2010 | Voutilainen et al. | |
| 2010/0235688 A1 | 9/2010 | Bennah et al. | |
| 2011/0029669 A1 | 2/2011 | Chuang et al. | |
| 2011/0153697 A1 | 6/2011 | Nickolov et al. | |
| 2012/0166390 A1 | 6/2012 | Merriman et al. | |
| 2012/0179446 A1* | 7/2012 | Tylutki | G06F 11/3442 703/21 |
| 2012/0249588 A1 | 10/2012 | Tison et al. | |
| 2012/0266166 A1 | 10/2012 | Farkas et al. | |
| 2012/0303767 A1 | 11/2012 | Renzin | |
| 2014/0075179 A1 | 3/2014 | Krishnapura et al. | |
| 2014/0082202 A1* | 3/2014 | Zhao | G06F 9/45558 709/226 |
| 2014/0129699 A1* | 5/2014 | Jeftovic | H04L 61/1511 709/224 |
| 2014/0156850 A1 | 6/2014 | Hunt | |
| 2014/0173580 A1 | 6/2014 | McDonald et al. | |
| 2014/0181294 A1 | 6/2014 | Deshpande et al. | |
| 2014/0280975 A1 | 9/2014 | Mordani et al. | |
| 2014/0282519 A1 | 9/2014 | Apte et al. | |
| 2014/0282520 A1 | 9/2014 | Sabharwal | |
| 2014/0297834 A1 | 10/2014 | Tripathi et al. | |
| 2014/0351809 A1 | 11/2014 | Chawla et al. | |
| 2014/0380308 A1 | 12/2014 | Hassine et al. | |
| 2015/0046572 A1 | 2/2015 | Cheng et al. | |
| 2015/0089496 A1 | 3/2015 | Thankappan et al. | |
| 2015/0113529 A1 | 4/2015 | Zhong | |
| 2015/0143382 A1 | 5/2015 | Chen et al. | |
| 2015/0149620 A1* | 5/2015 | Banerjee | H04L 41/14 709/224 |
| 2015/0154056 A1 | 6/2015 | Chen et al. | |
| 2015/0207752 A1 | 7/2015 | Birkestrand et al. | |
| 2015/0261578 A1* | 9/2015 | Greden | G06F 9/5044 718/1 |
| 2015/0286935 A1 | 10/2015 | Mukherjee et al. | |
| 2016/0004696 A1 | 1/2016 | Trenkov et al. | |
| 2016/0371105 A1 | 12/2016 | Sieffert et al. | |

OTHER PUBLICATIONS

Pham et al., "An Evaluation of ZooKeeper for High Availability in System S," ICPE '14, Mar. 22, 2014, 11 pages.

The International Searching Authority, "Invitation to Pay Additional Fees," issued in connection with application No. PCT/US2016/040205, on Oct. 20, 2016, 6 pages.

The International Searching Authority, "International Search Report and Written Opinion," issued in connection with application No. PCT/US2016/040205, dated Dec. 15, 2016, 19 pages.

Vmware Infrastructure, "Resource Management with VMware DRS," copyright 1998-2006, VMware Inc., Palo Alto, California, 24 pages.

United States Patent and Trademark Office, "Non-Final Office Action," issued in connection with U.S. Appl. No. 14/788,210, dated Jun. 30, 2015, 54 pages.

virtualRACK, An Inter Pole Enterprise, copyright 2009, http://www.virtualrack.in/, 1 page.

virtualRACK, "VirtualRack Overview," An Inter Pole Enterprise, copyright 2009, http://www.virtualrack.in/overview.php, 1 page.

virtualRACK, "Questions," An Inter Pole Enterprise, copyright 2009, http://www.virtualrack.in/questions.php, 3 pages.

virtualRACK, "Why VirtualRack?," An Inter Pole Enterprise, copyright 2009, http://www.virtualrack.in/why-virtualrack.php, 2 pages.

Vmware, "Using the CIM Object Space,"http://pubs.vmware.com/vsphere-55/index.jsp?topic=%2Fcom.vmware.cimsdk.smashpg.doc%2F03_CIM_SMASH_PG_Use_Cases.5.1.html, retrieved on Aug. 31, 2016, 1 page.

Cisco, "Proven Savings in IT Operations," http://www.cisco.com/c/en/us/products/servers-unified-computing/ucs-manager/index.html, retrieved on Aug. 31, 2016, 2 pages.

Cisco, "Servers—Unified Computing," http://www.cisco.com/c/en/us/products/servers-unified-computing/index.html,retrieved on Aug. 31, 2016, 3 pages.

Cisco, "Cisco UCS Faults and Error Messages Reference," http://www.cisco.com/c/en/us/td/docs/unified_computing/ucs/ts/faults/reference/ErrMess/UCS_SEMs.html, retrieved on Aug. 31, 2016, 125 pages.

Cisco, "Cisco UCS Manager Troubleshooting Reference Guide," Chapter: Troubleshooting Server Hardware Issues, http://www.cisco.com/c/en/us/td/docs/unified_computing/ucs/ts/guide/UCSTroubleshooting/UCSTroubleshooting_chapter_0111.html, retrieved on Aug. 31, 2016, 20 pages.

Cisco, "Cisco UCS C-Series Servers Integrated Management Controller CLI Configuration Guide, Release 1.3" http://www.cisco.com/c/en/us/td/docs/unified_computing/ucs/c/sw/cli/config/guide/131/b_Cisco_UCS_C-Series_CLI_Configuration_Guide_131.pdf, Mar. 11, 2011, 150 pages.

Intel, "IPMI, Intelligent Platform Management Interface Specification Second Generation V2.0," Feb. 12, 2004, http://www.intel.com/CONTENT/WWW//US/EN/SSERVERS/IPMI/SECOND-GEN-INTERFACE-SPEC-V2-REV1-4.HTML, 590 pages.

(56) References Cited

OTHER PUBLICATIONS

United States Patent and Trademark Office, "Non-Final Office Action," issued in connection with U.S. Appl. No. 14/788,004, dated Jun. 5, 2017, 32 pages.
United States Patent and Trademark Office, "Final Office Action," issued in connection with U.S. Appl. No. 14/796,803, dated May 22, 2017, 22 pages.
United States Patent and Trademark Office, "Non-Final Office Action," issued in connection with U.S. Appl. No. 14/752,699, dated Aug. 29, 2017, 35 pages.
United States Patent and Trademark Office, "Non-Final Office Action," issued in connection with U.S. Appl. No. 15/187,452, dated Aug. 30, 2017, 30 pages.
United States Patent and Trademark Office, "Non-Final Office Action," issued in connection with U.S. Appl. No. 14/796,826 dated Oct. 13, 2017, 46 pages.
United States Patent and Trademark Office, "Notice of Allowance," issued in connection with U.S. Appl. No. 14/796,803 dated Sep. 12, 2017, 45 pages.
United States Patent and Trademark Office, "Non-Final Office Action," issued in connection with U.S. Appl. No. 15/187,480, dated Nov. 8, 2017, 58 pages.
United States Patent and Trademark Office, "Notice of Allowance," issued in connection with U.S. Appl. No. 14/752,699, dated Mar. 27, 2018, 9 pages.
United States Patent and Trademark Office, "Notice of Allowance," issued in connection with U.S. Appl. No. 14/796,826, dated May 15, 2018, 15 pages.
United States Patent and Trademark Office, "Notice of Allowance," issued in connection with U.S. Appl. No. 14/788,004, dated Apr. 9, 2018, 8 pages.

* cited by examiner

METHODS AND APPARATUS TO RETIRE HOSTS IN VIRTUAL SERVER RACK DEPLOYMENTS FOR VIRTUAL COMPUTING ENVIRONMENTS

RELATED APPLICATIONS

This patent claims the benefit of U.S. Provisional Patent Application Ser. No. 62/023,813, filed Jul. 11, 2014, entitled "VIRTUAL RACK DEPLOYMENTS FOR VIRTUAL COMPUTING ENVIRONMENTS." U.S. Provisional Patent Application Ser. No. 62/023,813 is hereby incorporated by reference herein in its entirety.

FIELD OF THE DISCLOSURE

The present disclosure relates generally to cloud computing and, more particularly, to methods and apparatus to retire hosts in virtual server rack deployments for virtual computing environments.

BACKGROUND

Virtualizing computer systems provides benefits such as the ability to execute multiple computer systems on a single hardware computer, replicating computer systems, moving computer systems among multiple hardware computers, and so forth. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

DETAILED DESCRIPTION

Figure 1:
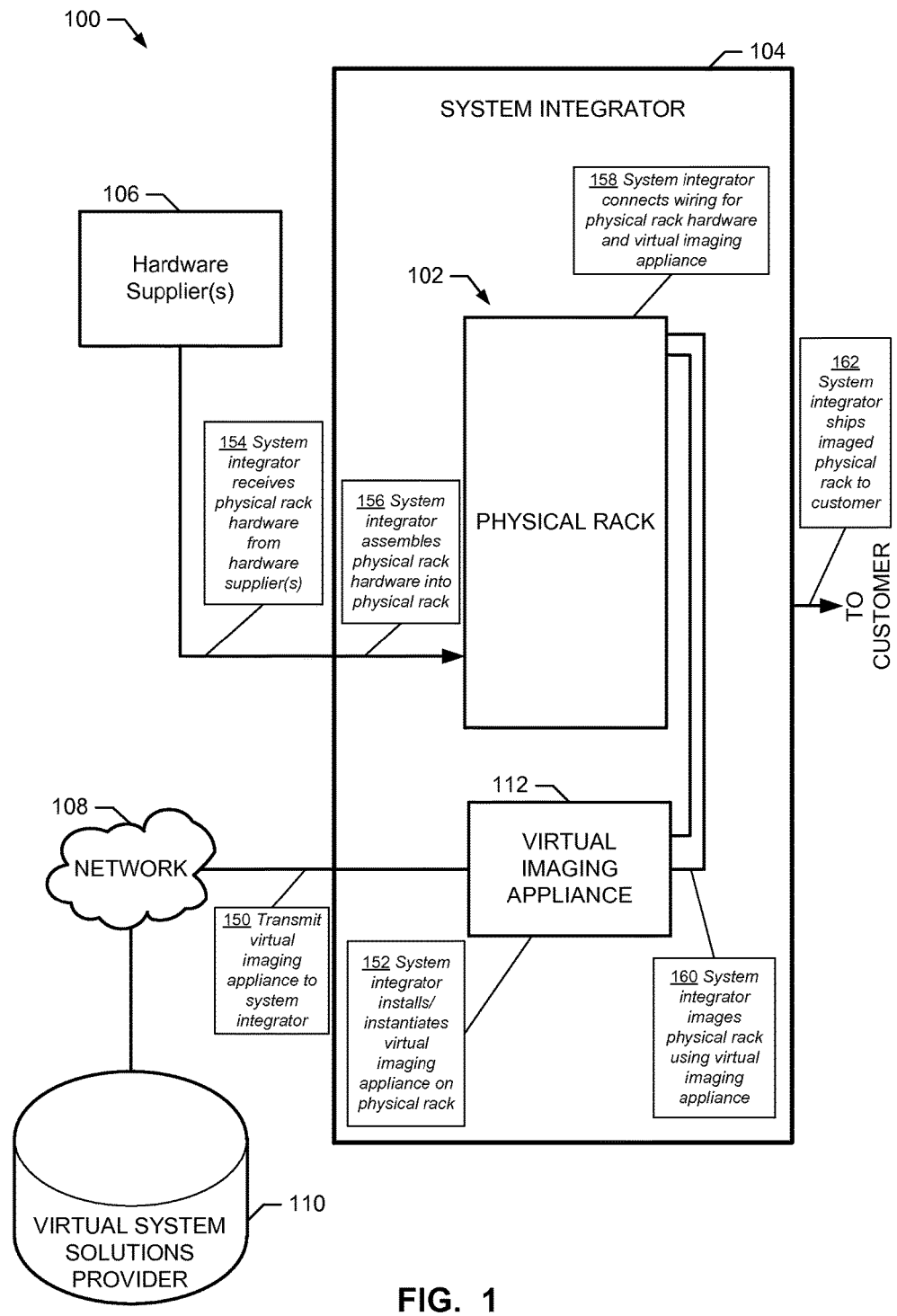
FIG. 1 depicts an example system showing components of an example physical rack deployment disclosed herein.

Cloud computing is based on the deployment of many physical resources across a network, virtualizing the physical resources into virtual resources, and provisioning the virtual resources for use across cloud computing services and applications. When starting up a cloud computing environment or adding resources to an already established cloud computing environment, data center operators struggle to offer cost-effective services while making resources of the infrastructure (e.g., storage hardware, computing hardware, and networking hardware) work together to achieve pain-free installation/operation and optimizing the resources for improved performance. Prior techniques for establishing and maintaining data centers to provide cloud computing services often lock a data center into a single source for hardware resources because of the need to use customized virtualization software specifically designed for a particular type of hardware. Examples disclosed herein enable establishing and maintaining data centers using virtualization software that is vendor-agnostic. In this manner, data center operators are provided with the flexibility of selecting from any of a number of hardware manufacturers to meet the physical hardware needs of data centers while making it relatively easy for the data center operators to initialize, virtualize and provision new resources. That is, data center operators may use examples disclosed herein to source hardware resources from any of a number of manufacturers without requiring the data center operators to undertake the burdens of developing new software to initialize, virtualize, and provision such resources.

A cloud computing environment (e.g., a virtual computing environment, a distributed deployment, etc.) allows a cluster of physical hosts (e.g., servers) to aggregate computing resources (e.g., processing resources, storage resources, networking resources, etc.) to create a pool of shared computing resources. When a workload profile to be accommodated by the cloud computing environment is received, the workload requirements are distributed across the pool of shared computing resources. For example, a workload profile may request a cloud computing environment provider provide a data center with 10 GHz processing allocated to the client. An example logical resource manager may map the workload requirements into logical resource needs such as a number of clusters, a number of physical hosts per cluster based on the processing, storage, and/or networking requirements, fault domains, etc. The logical resource manager may then use the available inventory of physical resources (e.g., the pool of shared computing resources) to allocate physical resources to meet and place the necessary logical resources. For example, the logical resource manager may provision the necessary clusters of logical infrastructure in the cloud computing environment. The workload is, in such examples, distributed across one or more physical resources in the cloud computing environments.

In some examples, it may be useful and/or necessary to remove/retire physical resources from the pool of shared computing resources. For example, a physical host (e.g., a server) may need to be taken offline (sometimes referred to herein as "retired" or "decommissioned"). When a physical host is retired, the computing resources provided by the physical host to the pool of shared computing resources are removed from the pool of shared computing resources. In some such examples, the workload is re-distributed across the updated pool of shared computing resources. However, in some examples, the updated workload distribution may not satisfy service level agreements associated with the workload and/or may fall below a threshold quality of service. For example, a service level agreement may specify that the cloud computing environment provider provide a minimum of 75% of the processing of the data center (e.g., 7.5 GHz) to the workload at all times. In some such examples, an updated workload distribution, in response to retiring a physical host, may not satisfy the service level agreement if, for example, the remaining physical resources in the pool of shared computing resources is unable to produce at least 7.5 GHz of processing at any time.

Examples disclosed herein receive a request to retire a physical host of a cloud computing environment and determine a projected impact of retiring the physical host. For example, disclosed examples determine a projected impact of retiring the physical host by determining a workload associated with the physical host and determining current resources provided by the physical host to accommodate the workload. In this manner, prior to performing a retirement, cloud computing environment providers are provided with information about the impact that retiring the physical host will have on the cloud computing environment. In some examples, when a projected impact indicates that a service level agreement will not be satisfied, a warning message is presented with an indication of the unsatisfied service level agreement. In some such examples, an administrator may deny the host retirement, for example, when the projected impact indicates that the service level agreement will not be satisfied.

In other examples, the administrator may approve (or confirm) the host retirement and initiate a host retirement process. For example, the selected host may transition into a maintenance mode which dynamically triggers a set of logical operations to relocate virtual machines (VMs) before starting maintenance on a hardware component (e.g., initiating host retirement on the selected host) to increase the likelihood of substantially little or no downtime in the virtual server rack deployment. When the virtual machines have been successfully relocated (e.g., to one or more other hosts), then examples disclosed herein retire the host by, for example, sending a SYS POWER OFF message to the selected host.

FIG. 1 depicts an example environment 100 in which a physical rack 102 is prepared by an example system integrator 104 for distribution to a customer. The example environment 100 includes the example physical rack 102, an example system integrator 104, an example hardware supplier(s) 106, an example network 108, an example virtual system solutions provider 110, and an example virtual imaging appliance 112.

The system integrator 104 of the illustrated example receives and fulfills customer orders for computing hardware. The system integrator 104 of the example of FIG. 1 obtains computer hardware and/or software from other suppliers, such as the example hardware supplier(s) 106, and assembles individual hardware components and/or software into functional computing units to fulfill customer orders. Alternatively, the system integrator 104 may design and/or build some or all of the hardware components and/or software to be used in assembling computing units. According to the illustrated example, the system integrator 104 prepares computing units for other entities (e.g., businesses and/or persons that do not own/employ and are not owned/employed by the system integrator 104). Alternatively, the system integrator 104 may assemble computing units for use by the same entity as the system integrator 104 (e.g., the system integrator 104 may be a department of a company, wherein the company orders and/or utilizes the assembled computing units). As used herein, the term customer refers to any person and/or entity that receives and/or operates the computing units supplied by the system integrator 104. In some examples, the system integrator 104 is an entity independent of equipment manufacturers such as white-label equipment manufacturers that provide hardware without branding. In other examples, the system integrator 104 is an original equipment manufacturer (OEM) partner or original device manufacturer (ODM) partner that partners with OEMs or ODMs (e.g., non-white label equipment manufacturers) that provide brand-labeled hardware. Example OEM/ODM hardware includes OEM/ODM Servers such as Hewlett-Packard® (HP) servers and Lenovo® servers, and OEM/ODM Switches such as Arista switches, and/or any other OEM/ODM servers, switches, or equipment that are labeled by the original manufacturers.

According to the illustrated example, one type of computing unit ordered from and/or assembled by the example system integrator 104 is the physical rack 102. The physical rack 102 is a combination of computing hardware and installed software that may be utilized by a customer to create and/or add to a virtual computing environment. For example, the physical rack 102 may include processing units (e.g., multiple blade servers), network switches to interconnect the processing units and to connect the physical rack 102 with other computing units (e.g., other ones of the physical rack 102 in a network environment such as a cloud computing environment), and/or data storage units (e.g., network attached storage, storage area network hardware, etc.). The physical rack 102 of the illustrated example is prepared by the system integrator 104 in a partially configured state to enable the computing devices to be rapidly deployed at a customer location (e.g., in less than 2 hours). For example, the system integrator 104 may install operating systems, drivers, operations software, management software, etc. The installed components may be configured with some system details (e.g., system details to facilitate intercommunication between the components of the physical rack 102) and/or may be prepared with software to collect further information from the customer when the virtual server rack is installed and first powered on by the customer.

To facilitate preparation of the physical rack 102 for distribution to a customer, the example system integrator 104 utilizes the virtual imaging appliance 112 to prepare and configure the operating systems, system configurations, software, etc. on the physical rack 102 prior to shipping the example server rack 102 to the customer. The virtual imaging appliance 112 of the illustrated example is a virtual computing appliance provided to the system integrator 104 by the example virtual system solutions provider 110 via the example network 108. The example virtual imaging appliance 112 is executed by the example system integrator 104 in a virtual computing environment of the system integrator 104. For example, the virtual imaging appliance 112 may be a virtual computing image, a virtual application, a container virtual machine image, a software application installed in an operating system of a computing unit of the system integrator 104, etc. The virtual imaging appliance 112 may alternatively be provided by any other entity and/or may be a physical computing device, may be multiple physical computing devices, and/or may be any combination of virtual and physical computing components.

The virtual imaging appliance 112 of the illustrated example retrieves software images and configuration data from the virtual systems solutions provider 110 via the network 108 for installation on the physical rack 102 during preparation of the physical rack 102. The virtual imaging appliance 112 of the illustrated example pushes (e.g., transmits, sends, etc.) the software images and configuration data to the components of the physical rack 102. For example, the virtual imaging appliance 112 of the illustrated example includes multiple network connections (e.g., virtual network connections, physical network connects, and/or any combination of virtual and network connections). For example, the virtual imaging appliance 112 of the illustrated examples connects to a management interface of a network switch(es) installed in the physical rack 102, installs network configuration information on the network switch(es), and reboots the switch(es) to load the installed configuration to communicatively couple the virtual imaging appliance 112 with the computing unit(s) communicatively coupled via the network switch(es). The example virtual imaging appliance 112 also connects to a management network interface (e.g., an out of band (OOB) interface) of a server(s) installed in the example physical rack 102 to cause an operating system(s) to be installed (e.g., utilizing a preboot execution environment (PXE) boot of an operating system installer). The example virtual imaging appliance 112 is also used to install virtual environment management components (described in further detail in conjunction with FIGS. 3-6 and in the following pages) and causes the virtual environment management components to boot so that they can take over the deployment of the example server rack 102.

The example virtual imaging appliance 112 is configured to perform many operations of the deployment without user intervention and without the need for a user of the example system integrator 104 to manually connect to the various interfaces of the components of the example physical rack 102. Furthermore, the user of the example virtual imaging appliance 112 is freed from the burden of locating the various software images that may be needed to configure the example physical rack 102 (e.g., firmware images for the network switch(es), operating system images for the server(s), operating system driver(s) for hardware components installed in the physical rack 102, etc.). Additionally, the virtual environment management components deployed by the example virtual imaging appliance 112 are configured by the virtual imaging appliance 112 to facilitate easy deployment of the physical rack 102 at the customer location. For example, the virtual management components installed on the physical rack 102 by the example virtual imaging appliance 112 include graphical user interfaces that guide a customer through the process of inputting configuration parameters (e.g., details of the customer's network, information about existing virtual environments, etc.). In addition, the example virtual management components automatically discover some information about the customer's system (e.g., automatically discover information about existing virtual environments).

The network 108 of the illustrated example communicatively couples the example system integrator 104 with the virtual system solutions provider 110. According to the illustrated example, the network 108 is the Internet. Alternatively, the network 108 may be any type of local network, wide area network, wireless network, wired network, any combination of networks, etc.

The virtual system solutions provider 110 of the illustrated example is a business that distributes (e.g., sells) the example virtual imaging appliance 112. The virtual system solutions provider 110 of the illustrated example also provides a repository of images and/or other types of software (e.g., virtual machine images, drivers, operating systems, etc.) that may be retrieved by the virtual imaging appliance 112 and installed on the physical rack 102. The virtual system solutions provider 110 may alternatively be implemented by multiple entities (e.g., from a manufacturer(s) of the software) and/or any other type of entity.

An example operation process utilized by the example system integrator 104 is illustrated by blocks 150-162 of FIG. 1. The example process begins when the example virtual system solutions provider 110 transmits the virtual imaging appliance 112 to the example system integrator 104 via the example network 108 (block 150). According to the illustrated example, the virtual imaging appliance 112 is a system image that is transmitted to the system integrator 104 to be implemented on computing hardware provided by the system integrator 104. Alternatively, the virtual imaging appliance 112 may be computing hardware and software that is assembled by the virtual system solutions provider 110 and shipped or otherwise delivered to the system integrator 104.

The example system integrator 104 installs and/or instantiates the virtual imaging appliance on computing resources (block 152). For example, the virtual imaging appliance 112 may be a virtual machine image that is installed in a virtual machine environment (e.g., a VMware® virtual machine disk, an open virtualization format (OVF) image, etc.).

The example system integrator 104 then receives virtual server rack hardware for assembling the physical rack 102 from the example hardware supplier(s) 106 (block 154). While, according to the illustrated example, the example system integrator 104 receives the virtual server rack hardware after receiving and installing the virtual imaging appliance 112, the system integrator 104 may alternatively receive the virtual server rack hardware at any other time (e.g., prior to receiving and/or installing the virtual imaging appliance 112).

After receiving the virtual server rack hardware from the example hardware supplier(s) 106, the example system integrator 104 assembles the virtual server rack hardware into a physical server rack (block 156). Alternatively, the virtual server rack hardware may not be assembled into a server rack (e.g., the virtual server rack hardware could be assembled in another type of computing hardware such as a computer case and/or may be computing hardware that will be communicatively coupled but not installed in a rack). The example system integrator 104 then connects wiring for the physical rack 102 to communicatively couple the components of the physical rack 102 and to communicatively couple the physical rack 102 to the example virtual imaging appliance 112 (block 158). According to the illustrated example, the virtual imaging appliance 112 is connected directly to the components of the physical rack 102 (e.g., connected to a management switch installed in the example physical rack 102).

Alternatively, the virtual imaging appliance 112 may be connected to the physical rack 102 via intermediate networking components. For example, the virtual imaging appliance 112 may be connected to the physical rack 102 via one or more network switches (e.g., in addition to network switches installed in the physical rack 102). In such an example, the virtual imaging appliance 112 may be communicatively coupled to a plurality of physical racks (e.g., physical racks like the example physical rack 102 that have been assembled by the example system integrator 104 and are ready to be deployed). Accordingly, in such an example a plurality of physical racks may be simultaneously or substantially simultaneously deployed. In such an example, a large number of physical racks may be provisioned for deployment in a rapid manner.

In some examples, the virtual imaging appliance 112 may be coupled with a remotely located physical rack. For example, the virtual imaging appliance 112 may be coupled to the example physical rack 102 via a wide area network, via a network that is not directly routable by the virtual imaging appliance 112, etc. For example, the virtual imaging appliance 112 may utilize a virtual private networking (VPN) connection to facilitate communication with the example physical rack 102. Accordingly, the physical rack 102 may be configured/deployed when it is located remotely from a location at which the example virtual imaging appliance 112 is operated. Thus, the virtual imaging appliance 112 may be utilized to configure physical racks that are located proximate the virtual imaging appliance 112 and physical racks that are located at remote locations.

Next, the example system integrator 104 utilizes the example virtual imaging appliance 112 to image operating systems, drivers, management systems, software, etc. onto the physical rack 102 (block 160). The example images may be retrieved from the virtual system solutions provider 110 via the example network 108 and/or may be retrieved from a local repository or other source. The example system integrator 104 may additionally power on the physical rack 102 and perform testing to verify that the hardware is operating properly and/or that the images transferred to the physical rack 102 are operating properly.

After imaging the physical rack 102, the example system integrator 104 ships and/or otherwise delivers the physical rack 102 to the customer (block 162). Thus, the physical rack 102 has been pre-configured to allow the customer to power on the example physical rack 102 and quickly prepare the physical rack 102 for installation in a new and/or existing computing system (e.g., a cloud computing system). For example, upon initially powering on the example physical rack 102, the components of the example physical rack 102 are already configured to communicate with each other and execute operating systems and software, which allows the example physical rack 102 to provide an interface (e.g., a webpage interface) that, when accessed by the customer or an installer, gathers additional information for completing the configuration of the physical rack 102. For example, the interface may gather and/or configure user credentials, network information, information about networked components (e.g., an address for a storage device such as a storage area network (SAN), an address for a management system (e.g., a VMware vCenter server(s)), etc.). The gathered information can be utilized by the components of the example physical rack 102 to setup the physical rack 102 as a part of a new computing cluster and/or add the example physical rack 102 to an existing computing cluster (e.g., a cloud computing system).

While an example process is described in conjunction with blocks 150-162, any other process may be utilized. The order of the blocks may be changed. For example, the system integrator may receive and assemble the hardware for the example physical rack 102 (blocks 154-156) prior to receiving and/or installing the virtual imaging appliance 112. Furthermore, once the example system integrator 104 has received the example virtual imaging appliance 112, the system integrator 104 may assemble and/or image (block 154-160) multiple ones of the physical rack 102 using that same virtual imaging appliance 112.

Figure 2:
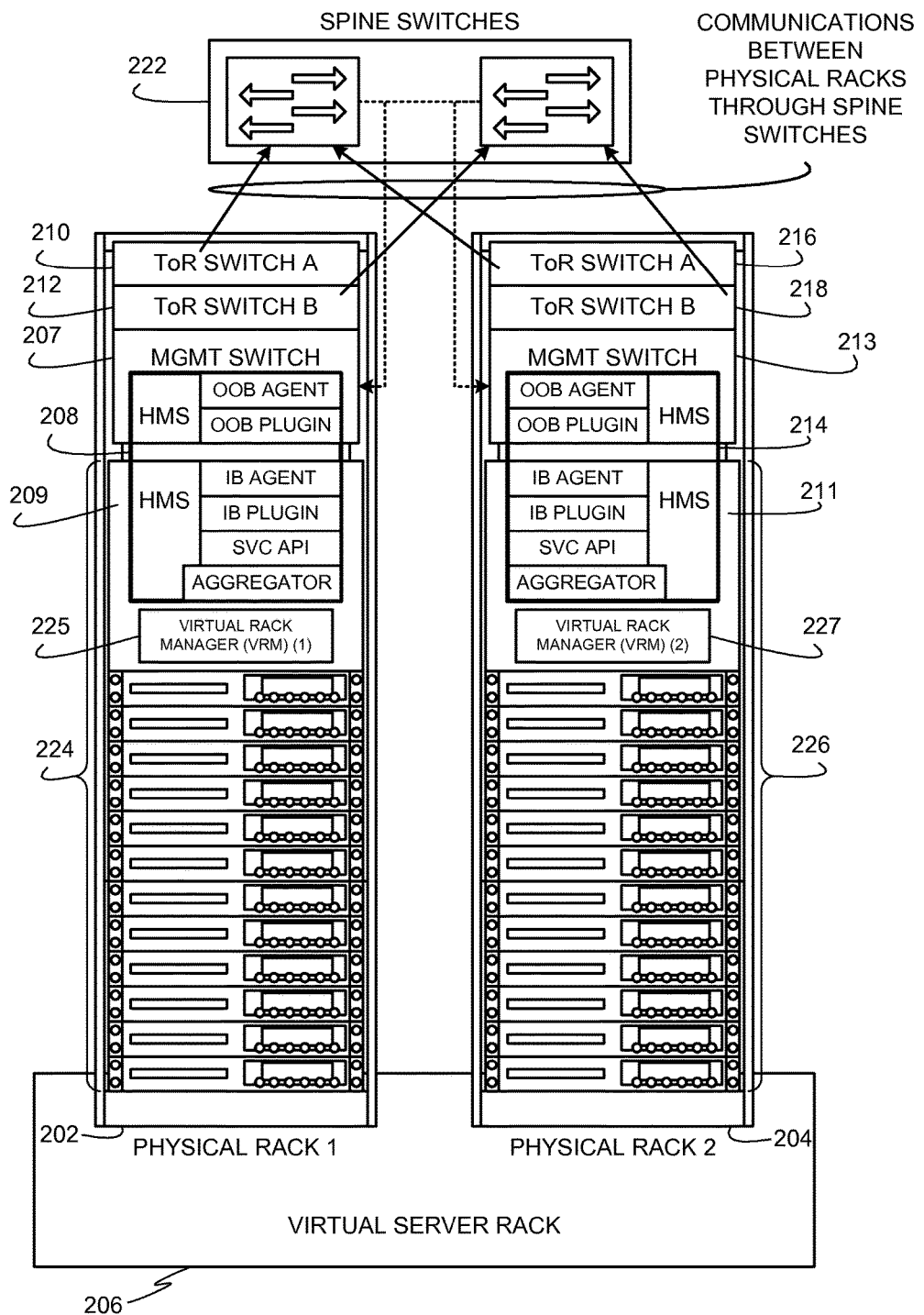
FIG. 2 depicts example physical racks in an example virtual server rack deployment.

FIG. 2 depicts example physical racks 202, 204 in an example deployment of a virtual server rack 206. For example, the physical racks 202, 204 may be ones of the physical rack 102 assembled by the example system integrator 104 of FIG. 1. In the illustrated example, the first physical rack 202 has an example top-of-rack (ToR) switch A 210, an example ToR switch B 212, an example management switch 207, and an example server host node(0) 209. In the illustrated example, the management switch 207 and the server host node(0) 209 run a hardware management system (HMS) 208 for the first physical rack 202. The second physical rack 204 of the illustrated example is also provided with an example ToR switch A 216, an example ToR switch B 218, an example management switch 213, and an example server host node(0) 211. In the illustrated example, the management switch 213 and the server host node (0) 211 run an HMS 214 for the second physical rack 204.

In the illustrated example, the management switches 207, 213 of the corresponding physical racks 202, 204 run corresponding out-of-band (OOB) agents (e.g., an example OOB agent 612 described below in connection with FIG. 6) and OOB plugins (e.g., an example OOB plugin 621 described below in connection with FIG. 6) of the corresponding HMSs 208, 214. Also in the illustrated example, the server host nodes(0) 209, 211 of the corresponding physical racks 202, 204 run corresponding IB agents (e.g., an example IB agent 613 described below in connection with FIG. 6), IB plugins (e.g., an example IB plugin 623 described below in connection with FIG. 6), HMS service APIs (e.g., an example generic HMS service API 610 described below in connection with FIG. 6), and aggregators (e.g., an example HMS aggregator 611 described below in connection with FIG. 6).

In the illustrated example, the HMS 208, 214 connects to server management ports of the server host node(0) 209, 211 (e.g., using a baseboard management controller (BMC)), connects to ToR switch management ports (e.g., using 1 Gbps links) of the ToR switches 210, 212, 216, 218, and also connects to spine switch management ports of one or more spine switches 222. These example connections form a non-routable private Internet protocol (IP) management network for OOB management. The HMS 208, 214 of the illustrated example uses this OOB management interface to the server management ports of the server host node(0) 209, 211 for server hardware management. In addition, the HMS 208, 214 of the illustrated example uses this OOB management interface to the ToR switch management ports of the ToR switches 210, 212, 216, 218 and to the spine switch management ports of the one or more spine switches 222 for switch management. In examples disclosed herein, the ToR switches 210, 212, 216, 218 connect to server network interface card (NIC) ports (e.g., using 10 Gbps links) of server hosts in the physical racks 202, 204 for downlink communications and to the spine switch(es) (e.g., using 40 Gbps links) for uplink communications. In the illustrated example, the management switch 207, 213 is also connected to the ToR switches 210, 212, 216, 218 (e.g., using a 10 Gbps link) for internal communications between the management switch 207, 213 and the ToR switches 210, 212, 216, 218. Also in the illustrated example, the HMS 208, 214 is provided with IB connectivity to individual server nodes (e.g., server nodes in example physical hardware resources 224, 226) of the physical rack 202, 204. In the illustrated example, the IB connection interfaces to physical hardware resources 224, 226 via an operating system running on the server nodes using an OS-specific API such as vSphere API, command line interface (CLI), and/or interfaces such as Common Information Model from Distributed Management Task Force (DMTF).

The HMSs 208, 214 of the corresponding physical racks 202, 204 interface with virtual rack managers (VRMs) 225, 227 of the corresponding physical racks 202, 204 to instantiate and manage the virtual server rack 206 using physical hardware resources 224, 226 (e.g., processors, network interface cards, servers, switches, storage devices, peripherals, power supplies, etc.) of the physical racks 202, 204. In the illustrated example, the VRM 225 of the first physical rack 202 runs on three server host nodes of the first physical rack 202, one of which is the server host node(0) 209. As used herein, the term "host" refers to a functionally indivisible unit of the physical hardware resources 224, 226, such as a physical server that is configured or allocated, as a whole, to a virtual rack and/or workload; powered on or off in its entirety; or may otherwise be considered a complete functional unit. Also in the illustrated example, the VRM 227 of the second physical rack 204 runs on three server host nodes of the second physical rack 204, one of which is the server host node(0) 211. In the illustrated example, the VRMs 225, 227 of the corresponding physical racks 202, 204 communicate with each other through one or more spine switches 222. Also in the illustrated example, communications between physical hardware resources 224, 226 of the physical racks 202, 204 are exchanged between the ToR switches 210, 212, 216, 218 of the physical racks 202, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the virtual server rack 206.

In examples disclosed herein, a command line interface (CLI) and APIs are used to manage the ToR switches 210, 212, 216, 218. For example, the HMS 208, 214 uses CLI/APIs to populate switch objects corresponding to the ToR switches 210, 212, 216, 218. On HMS bootup, the HMS 208, 214 populates initial switch objects with statically available information. In addition, the HMS 208, 214 uses a periodic polling mechanism as part of an HMS switch management application thread to collect statistical and health data from the TOR switches 210, 212, 216, 218 (e.g., Link states, Packet Stats, Availability, etc.). There is also a configuration buffer as part of the switch object which stores the configuration information to be applied on the switch.

Figure 3:
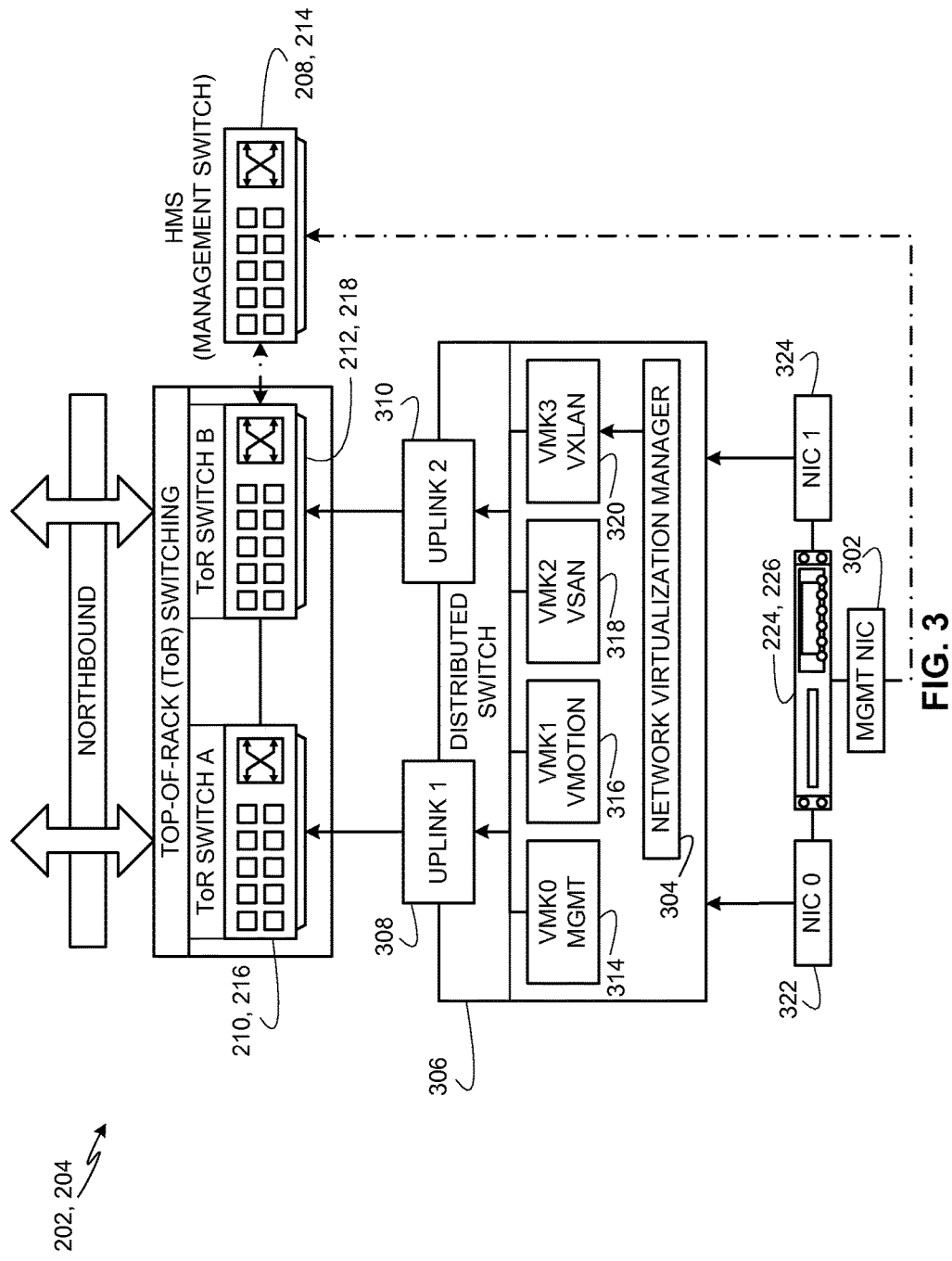
FIG. 3 depicts an example configuration of one of the example physical racks of FIG. 2.

FIG. 3 depicts an example configuration of one of the example physical racks 202, 204 of FIG. 2. In the illustrated example of FIG. 3, the HMS 208, 214 is in communication with a physical hardware resource 224, 226 through a management network interface card (NIC) 302. The example HMS 208, 214 is also shown in communication with the example ToR switches 210, 216, 212, 218. The example ToR switches 210, 216, 212, 218 are in communication with a distributed switch 306 through multiple uplink ports 308, 310 of the distributed switch 306. In the illustrated example, the uplink ports 308, 310 are implemented using separate network interface cards (NICs).

In the illustrated example, the distributed switch 306 runs numerous virtual adapters known as virtual machine kernels (VMKs) including an example VMK0 management kernel 314, an example VMK1 vMotion kernel 316, an example VMK2 vSAN kernel 318, and an example VMK3 VXLAN 320. The VMK0 management kernel 314 virtual adapter is software executed by the distributed switch 306 to manage use of ones of or portions of the physical hardware resources 224, 226 allocated for use by the distributed switch 306. In examples disclosed herein, the VRML 225 of FIG. 2 uses the VMK0 management kernel 314 to communicate with the VRM2 227 through the spine switches 222 of FIG. 2. The VMK1 vMotion 316 virtual adapter is software executed by the distributed switch 306 to facilitate live migration of virtual machines between physical hardware resources 224, 226 with substantially little or no downtime to provide continuous service availability from the virtual machines being migrated. The VMK2 vSAN 318 virtual adapter is software executed by the distributed switch 306 to aggregate locally attached data storage disks in a virtual cluster to create a storage solution that can be provisioned from the distributed switch 306 during virtual machine provisioning operations. The example VMK3 VXLAN 320 is virtual adapter software executed by the distributed switch to establish and/or support one or more virtual networks provisioned in the distributed switch 306. In the illustrated example, the VMK3 VXLAN 320 is in communication with an example network virtualization manager 304. The network virtualization manager 304 of the illustrated example virtualizes network resources such as physical hardware switches to provide software-based virtual networks. The example network virtualization manager 304 may be implemented using, for example, the VMware NSX network virtualization platform. In the illustrated example of FIG. 3, the distributed switch 306 is shown interfacing with one or more of the physical hardware resources 224, 226 through multiple NICs 322, 324. In this manner, the VM kernels 314, 316, 318, 320 can instantiate virtual resources based on one or more, or portions of, the physical hardware resources 224, 226.

The HMS 208, 214 of the illustrated examples of FIGS. 2 and 3, is a stateless software agent responsible for managing individual hardware elements in a physical rack 202, 204. Examples of hardware elements that the HMS 208, 214 manages are servers and network switches in the physical rack 202, 204. In the illustrated example, the HMS 208, 214 is implemented using Java on Linux so that an OOB portion (e.g., the OOB agent 612 of FIG. 6) of the HMS 208, 214 run as a Java application on a white box management switch (e.g., the management switch 207, 213) in the physical rack 202, 204. However, any other programming language and any other operating system may be used to implement the HMS 208, 214. The physical hardware resources 224, 226 that the HMS 208, 214 manages include white label equipment such as white label servers, white label network switches, white label external storage arrays, and white label disaggregated rack architecture systems (e.g., Intel's Rack Scale Architecture (RSA)). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding. In some examples, the HMS 208, 214 may also be used to manage non-white label equipment such as original equipment manufacturer (OEM) equipment. Such OEM equipment includes OEM Servers such as Hewlett-Packard® (HP) servers and Lenovo® servers, and OEM Switches such as Arista switches, and/or any other OEM server, switches, or equipment.

Figure 4:
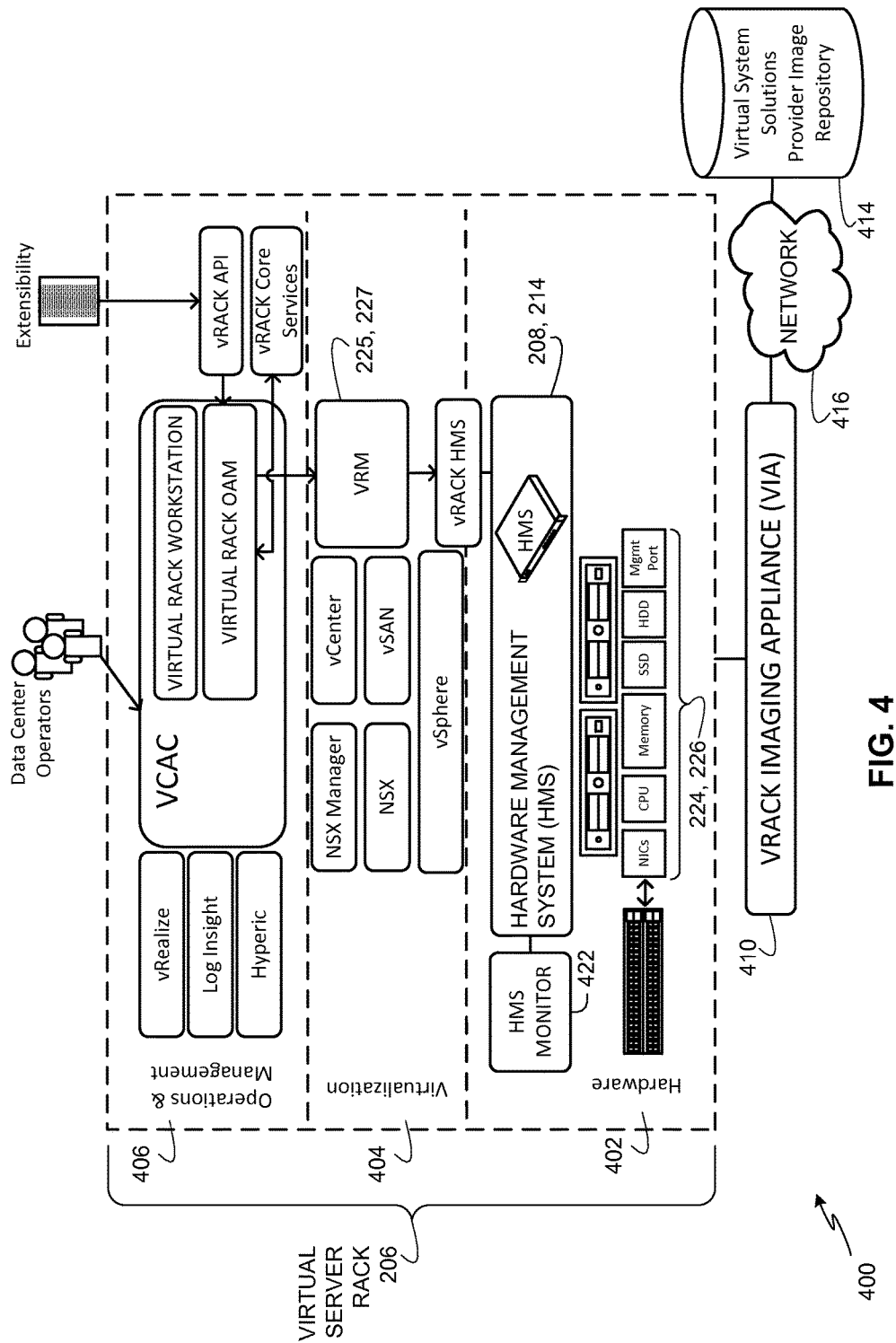
FIG. 4 depicts an example architecture to configure and deploy the example virtual server rack of FIG. 2.

FIG. 4 depicts an example architecture 400 in which an example virtual imaging appliance 410 (e.g., the example virtual imaging appliance 112 of FIG. 1) is utilized to configure and deploy the virtual server rack 206 (e.g., one or more of the example physical rack 102 of FIG. 1).

The example architecture 400 of FIG. 4 includes a hardware layer 402, a virtualization layer 404, and an operations and management layer 406. In the illustrated example, the hardware layer 402, the virtualization layer 404, and the operations and management layer 406 are part of the example virtual server rack 206 of FIG. 2. The virtual server rack 206 of the illustrated example is based on the physical racks 202, 204 of FIG. 2. Additionally or alternatively, the virtual server rack 206 may be based on the physical rack 102 of FIG. 1. For example, the physical rack 102 may be configured to be in communication with the physical racks 202, 204 to form part of the virtual server rack 206. Alternatively, any one of the physical racks 102, 202, 204 may be operated in a stand-alone manner to instantiate and run the virtual server rack 206. The example virtual server rack 206 is configured to configure the physical hardware resources 224, 226, to virtualize the physical hardware resources 224, 226 into virtual resources, to provision virtual resources for use in providing cloud-based services, and to maintain the physical hardware resources 224, 226 and the virtual resources. The example architecture 400 includes a virtual imaging appliance (VIA) 410 that communicates with the hardware layer 402 to store operating system (OS) and software images in memory of the hardware layer 402 for use in initializing physical resources needed to configure the virtual server rack 206. In the illustrated example, the VIA 410 retrieves the OS and software images from a virtual system solutions provider image repository 414 via an example network 416. For example, the VIA 410 may be the virtual imaging appliance 112 provided to the system integrator 104 of FIG. 1 by the example virtual system solutions provider 110 of FIG. 1 to configure new physical racks (e.g., the physical rack 102 of FIG. 1 and/or the physical racks 202, 204 of FIGS. 2 and 3) for use as virtual server racks (e.g., the virtual server rack 206). That is, whenever the system integrator 104 wishes to configure new hardware (e.g., a new physical rack) for use as a virtual server rack, the system integrator 104 connects the VIA 410 to the new hardware, and the VIA 410 communicates with the virtual system provider image repository 414 to retrieve OS and/or software images needed to configure the new hardware for use as a virtual server rack. In the illustrated example, the OS and/or software images located in the virtual system provider image repository 414 are configured to provide the system integrator 104 with flexibility in selecting to obtain hardware from any of a number of hardware manufacturers. As such, end users can source hardware from multiple hardware manufacturers without needing to develop custom software solutions for each hardware manufacturer. Further details of the example VIA 410 are disclosed in U.S. patent application Ser. No. 14/752,699, filed on Jun. 26, 2015, and titled "Methods and Apparatus for Rack Deployments for Virtual Computing Environments," which is hereby incorporated herein by reference in its entirety.

The example hardware layer 402 of FIG. 4 includes the HMS 208, 214 of FIGS. 2 and 3 that interfaces with the physical hardware resources 224, 226 (e.g., processors, network interface cards, servers, switches, storage devices, peripherals, power supplies, etc.). The HMS 208, 214 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 206 in a hardware-independent manner. The HMS 208, 214 also supports rack-level boot-up sequencing of the physical hardware resources 224, 226 and provides services such as secure resets, remote resets, and/or hard resets of the physical hardware resources 224, 226.

The HMS 208, 214 of the illustrated example is part of a dedicated management infrastructure in a corresponding physical rack 102, 202, 204 including the dual-redundant management switches 207, 213 and dedicated management ports attached to the server host nodes(0) 209, 211 and the ToR switches 210, 212, 216, 218 (FIGS. 2 and 3). In the illustrated example, one instance of the HMS 208, 214 runs per physical rack 102, 202, 204. For example, the HMS 208, 214 may run on the management switch 207, 213 and the server host node(0) 209, 211 installed in the example physical rack 102 of FIG. 1. In the illustrated example of FIG. 2 both of the HMSs 208, 214 are provided in corresponding management switches 207, 213 and the corresponding server host nodes(0) 209, 211 as a redundancy feature in which one of the HMSs 208, 214 is a primary HMS, while the other one of the HMSs 208, 214 is a secondary HMS. In this manner, one of the HMSs 208, 214 may take over as a primary HMS in the event of a failure of a hardware management switch 207, 213 and/or a failure of the server host nodes(0) 209, 211 on which the other HMS 208, 214 executes. In some examples, to achieve seamless failover, two instances of an HMS 208, 214 run in a single physical rack 102, 202, 204. In such examples, the physical rack 102, 202, 204 is provided with two management switches, and each of the two management switches runs a separate instance of the HMS 208, 214. In such examples, the physical rack 202 of FIG. 2 runs two instances of the HMS 208 on two separate physical hardware management switches and two separate server host nodes(0), and the physical rack 204 of FIG. 2 runs two instances of the HMS 214 on two separate physical hardware management switches and two separate server host nodes(0). In this manner, for example, one of the instances of the HMS 208 on the physical rack 202 serves as the primary HMS 208 and the other instance of the HMS 208 serves as the secondary HMS 208. The two instances of the HMS 208 on two separate management switches and two separate server host nodes(0) in the physical rack 202 (or the two instances of the HMS 214 on two separate management switches and two separate server host nodes(0) in the physical rack 204) are connected over a point-to-point, dedicated Ethernet link which carries heartbeats and memory state synchronization between the primary and secondary HMS instances.

There are numerous categories of failures that the HMS 208, 214 can encounter. Some example failure categories are shown below in Table 1.

TABLE 1

HMS Failure Categories

| Failure Type | Examples | Impact | Remediation |
| --- | --- | --- | --- |
| 1. HMS Agent Software Failures | Unable to allocate new resources Memory corruption Software Crash CPU hogging Memory leaks | Short term loss of HMS function [Minutes] | Restart from Monitor |
| 2. HMS Agent Unrecoverable Software Failure | Unable to start demon Unable to resolve Failure Type1 Consistent software crash | Longer term loss of HMS function [Hours] | Maintenance mode thin HMS Agent till issue resolved |
| 3. Management Switch Operating System Software Failures | Processes Failures Kernel Failures Unable to boot switch OS ONIE/bootloader issues | Short to Long Term Loss of Mgmt Switch and HMS function | Process restart for user processes. Reboots for Kernel failures Manual intervention for failed boots |
| 4. Management Switch Hardware Failures | Link down on management ports to Server Link Down on management ports to ToR nodes Link down from VRM Host to HMS on Mgmt Switch Critical Hardware alarms | Portions of rack unavailable VRM-HMS communication loss | Reset Links from PRM Notify VRM for manual intervention |
| 5. Management Switch Un-Recoverable Hardware Failure | Management switch fails to boot Erratic Resets of hardware while running | Long term loss of HMS/Mgmt Switch | Manual intervention or standby switch |

In the illustrated example of FIG. 4, the hardware layer 402 includes an example HMS monitor 422 to monitor the operational status and health of the HMS 208, 214. The example HMS monitor 422 is an external entity outside of the context of the HMS 208, 214 that detects and remediates failures in the HMS 208, 214. That is, the HMS monitor 422 is a process that runs outside the HMS daemon to monitor the daemon. For example, the HMS monitor 422 can run alongside the HMS 208, 214 in the same management switch 207, 213 as the HMS 208, 214. The example HMS monitor 422 is configured to monitor for Type 1 failures of Table 1 above and restart the HMS daemon when required to remediate such failures. The example HMS monitor 422 is also configured to invoke a HMS maintenance mode daemon to monitor for Type 2 failures of Table 1 above. In examples disclosed herein, an HMS maintenance mode daemon is a minimal HMS agent that functions as a basic backup of the HMS 208, 214 until the Type 2 failure of the HMS 208, 214 is resolved.

The example virtualization layer 404 includes the virtual rack manager (VRM) 225, 227. The example VRM 225, 227 communicates with the HMS 208, 214 to manage the physical hardware resources 224, 226. The example VRM 225, 227 creates the example virtual server rack 206 out of underlying physical hardware resources 224, 226 that may span one or more physical racks (or smaller units such as a hyper-appliance or half rack) and handles physical management of those resources. The example VRM 225, 227 uses the virtual server rack 206 as a basis of aggregation to create and provide operational views, handle fault domains, and scale to accommodate workload profiles. The example VRM 225, 227 keeps track of available capacity in the virtual server rack 206, maintains a view of a logical pool of virtual resources throughout the SDDC life-cycle, and translates logical resource provisioning to allocation of physical hardware resources 224, 226. The example VRM 225, 227 interfaces with components of the virtual system solutions provider 110 (FIG. 1) such as vSphere®, vCenter™ and NSX™ manager, and presents the logical view of underlying resources such as hosts and clusters. The example VRM 225, 227 also uses the logical view for orchestration and provisioning of workloads. The example VRM 225, 227 also uses the logical view for enabling retiring (e.g., decommissioning, taking offline, etc.) the physical hardware resources 224, 226 of the virtual server rack 206. For example, the VRM 225, 227 may determine a projected impact of retiring a host on workloads. Additional details of the VRM 225, 227 are disclosed below in connection with FIGS. 5 and 7-9.

The virtualization layer 404 of the illustrated example, and its associated components are configured to run virtual machines. However, in other examples, the virtualization layer 404 may additionally or alternatively be configured to run containers. A virtual machine is a data computer node that operates with its own guest operating system on a host using resources of the host virtualized by virtualization software. A container is a data computer node that runs on top of a host operating system without the need for a hypervisor or separate operating system.

The virtual server rack 206 of the illustrated example enables abstracting the physical hardware resources 224, 226. In some examples, the virtual server rack 206 includes a set of physical units (e.g., one or more racks) with each unit including hardware 224, 226 such as server nodes (e.g., compute+storage+network links), network switches, and, optionally, separate storage units. From a user perspective, the example virtual server rack 206 is an aggregated pool of logic resources exposed as one or more vCenter ESXi™ clusters along with a logical storage pool and network connectivity.

In the illustrated example, the example OAM layer 406 is an extension of a VMware vCloud® Automation Center (VCAC) that relies on the VCAC functionality and also leverages utilities such as vRealize, Log Insight™, and Hyperic® to deliver a single point of SDDC operations and management. The example OAM layer 406 is configured to provide different services such as heat-map service, capacity planner service, maintenance planner service, events and operational view service, and virtual rack application workloads manager service.

In the illustrated example, a heat map service of the OAM layer 406 exposes component health for hardware mapped to virtualization and application layers (e.g., to indicate good, warning, and critical statuses). The example heat map service also weighs real-time sensor data against offered service level agreements (SLAs) and may trigger some logical operations to make adjustments to ensure continued SLA. In some examples, the VRM 225, 227 may determine a projected impact of retiring a physical host and compare the projected impact to offered SLAs to ensure continued SLA.

In the illustrated example, the capacity planner service of the OAM layer 406 checks against available resources and looks for potential bottlenecks before deployment of an application workload. Example capacity planner service also integrates additional rack units in the collection/stack when capacity is expanded.

In the illustrated example, the maintenance planner service of the OAM layer 406 dynamically triggers a set of logical operations to relocate virtual machines (VMs) before starting maintenance on a hardware component to increase the likelihood of substantially little or no downtime. The example maintenance planner service of the OAM layer 406 creates a snapshot of the existing state before starting maintenance on an application. The example maintenance planner service of the OAM layer 406 automates software upgrade/maintenance by creating a clone of the machines and proceeds to upgrade software on clones, pause running machines, and attaching clones to a network. The example maintenance planner service of the OAM layer 406 also performs rollbacks if upgrades are not successful.

In the illustrated example, an events and operational views service of the OAM layer 406 provides a single dashboard for logs by feeding to Log Insight. The example events and operational views service of the OAM layer 406 also correlates events from the heat map service against logs (e.g., a server starts to overheat, connections start to drop, lots of HTTP/503 from App servers). The example events and operational views service of the OAM layer 406 also creates a business operations view (e.g., a top down view from Application Workloads=>Logical Resource View=>Physical Resource View). The example events and operational views service of the OAM layer 406 also provides a logical operations view (e.g., a bottom up view from Physical resource view=>vCenter ESXi Cluster View=>VM's view).

In the illustrated example, the virtual rack application workloads manager service of the OAM layer 406 uses vCAC and vCAC enterprise services to deploy applications to vSphere hosts. The example virtual rack application workloads manager service of the OAM layer 406 uses data from the heat map service, the capacity planner service, the maintenance planner service, and the events and operational views service to build intelligence to pick the best mix of applications on a host (e.g., not put all high CPU intensive apps on one host). The example virtual rack application workloads manager service of the OAM layer 406 optimizes applications and virtual storage area network (vSAN) arrays to have high data resiliency and best possible performance at same time.

Figure 5:
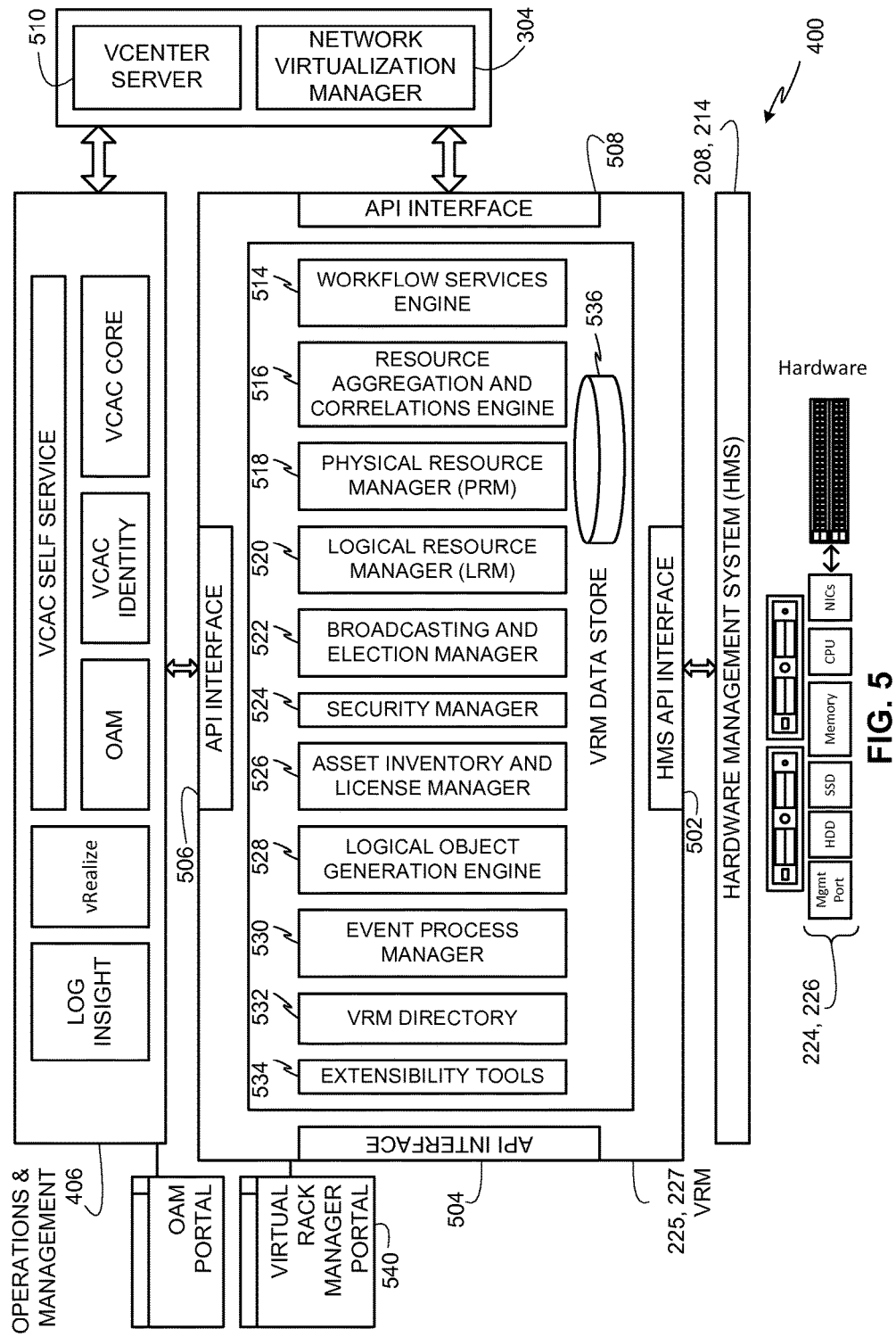
FIG. 5 depicts the example hardware management system (HMS) of FIGS. 2-4 interfacing between the example hardware and an example virtual resource manager (VRM) of FIGS. 2 and 4.

FIG. 5 depicts another view of the example architecture 400 of FIG. 4 showing the example HMS 208, 214 of FIGS. 2-4 interfacing between the example physical hardware resources 224, 226 of FIGS. 2-4 and the example VRM 225, 227 of the example architecture 400 of FIG. 4. In the illustrated example, the VRM 225, 227 includes numerous application program interfaces (APIs) 502, 504, 506, 508 to interface with other components of the architecture 400. The APIs 502, 504, 506, 508 of the illustrated example include routines, protocols, function calls, and other components defined for use by external programs, routines, or components to communicate with the VRM 225, 227. Such communications may include sending information to the VRM 225, 227, requesting information from the VRM 225, 227, requesting the VRM 225, 227 to perform operations, configuring the VRM 225, 227, etc. For example, an HMS API interface 502 of the VRM 225, 227 is to facilitate communications between the HMS 208, 214 and the VRM 225, 227, another API interface 506 of the VRM 225, 227 is to facilitate communications between the operations and management layer 406 and the VRM 225, 227, and another API interface 508 of the VRM 225, 227 is to facilitate communications between the VRM 225, 227 and the network virtualization manager 304 and a vCenter server 510. Another API interface 504 of the VRM 225, 227 may be used to facilitate communications between the VRM 225, 227 and user interfaces for use by administrators to manage the VRM 225, 227.

The example VRM 225, 227 communicates with the HMS 208, 214 via the HMS API interface 502 to manage the physical hardware resources 224, 226. For example, the VRM 225, 227 obtains and maintains inventory of the physical hardware resources 224, 226 through communications with the HMS 208, 214. The example VRM 225, 227 also uses the HMS 208, 214 to discover new hardware (e.g., the physical hardware resources 224, 226) and adds newly discovered hardware to inventory. The example VRM 225, 227 is also configured to manage the physical hardware resources 224, 226 within the virtual server rack 206 by using the per-rack HMS 208, 214. The example VRM 225, 227 maintains the notion of fault domains and uses those domains in its mapping of logical resources (e.g., virtual resources) to the physical hardware resources 224, 226. In response to notification of hardware events from the HMS 208, 214, the example VRM 225, 227 handles addition/removal of physical hardware resources 224, 226 (e.g., servers or switches at a physical rack level), addition of new rack units, maintenance, and hard shutdowns/resets. The example VRM 225, 227 also translates physical sensor data and alarms to logical events.

In the illustrated example of FIG. 5, a software stack of the VRM 225, 227 includes an example workflow services engine 514, an example resource aggregation and correlations engine 516, an example physical resource manager (PRM) 518, an example logical resource manager (LRM) 520, an example broadcasting and election manager 522, an example security manager 524, an example asset inventory and license manager 526, an example logical object generation engine 528, an example event process manager 530, an example VRM directory 532, and example extensibility tools 534. The example VRM 225, 227 also includes an example VRM data store 536. The example workflow services engine 514 is provided to manage the workflows of services provisioned to be performed by resources of the virtual server rack 206. For example, the workflow services engine 514 may store workload profiles and/or retrieve workload profiles from the example virtual rack manager data store 536.

The example resource aggregation and correlations engine 516 is provided to aggregate logical and physical resources and to coordinate operations between the logical and physical resources for allocating to services to be performed by the virtual server rack 206. For example, the physical resource manager 518 may maintain, in the virtual rack manager data store 536, an inventory of the physical hardware resources 224, 226, the characteristics and/or capabilities of the physical hardware resources 224, 226, the current state of the physical hardware resources 224, 226, etc.

The example PRM 518 is provided to provision, maintain, allocate, and manage the physical hardware resources 224, 226 for use by the virtual server rack 206 for provisioning and allocating logical resources. For example, the physical resource manager 518 may maintain, in the virtual rack manager data store 536, an inventory of the physical hardware resources 224, 226, the characteristics and/or capabilities of the physical hardware resources 224, 226, the current state of the physical hardware resources 224, 226, etc.

The example LRM 520 is provided to provision, maintain, allocate, and manage logical resources. The example broadcasting and election manager 522 is provided to broadcast or advertise capabilities of the virtual server rack 206. For example, services seeking resources of virtual server racks may obtain capabilities (e.g., logical resources) that are available from the virtual server rack 206 by receiving broadcasts or advertisements of such capabilities from the broadcasting and election manager 522. The broadcasting and election manager 522 is also configured to identify resources of the virtual server rack 206 that have been requested for allocation. The example security manager 524 is provided to implement security processes to protect from misuse of resources of the virtual server rack 206 and/or to protect from unauthorized accesses to the virtual server rack 206. The example asset inventory and license manager 526 is provided to manage inventory of components of the virtual server rack 206 and to ensure that the different components of the virtual server rack 206 are used in compliance with licensing requirements. For example, the asset inventory and license manager 526 may ensure a workload satisfies an offered service level agreement (SLA) (e.g., a set of requirements and/or workload characteristics). An SLA may define requirements for capacity, availability, reliability, latency, an affinity towards certain physical hardware resources, redundancy, etc. For example, an SLA may define an availability commitment for one or more classes of service (e.g., a dedicated cloud service, a virtual private cloud service, a virtual private cloud OnDemand service, etc.). The example asset inventory and license manager 526 of FIG. 5 weighs real-time sensor data and/or projected sensor data against the offered SLA to ensure continued SLA. In the illustrated example, when the asset inventory and license manager 526 determines that a workload (e.g., an actual, real-time workload, a projected workload, etc.) does not satisfy an SLA, the example asset inventory and license manager 526 causes a warning message (e.g., an alert) to be presented (e.g., to the administrator). In the illustrated example, the example asset inventory and license manager 526 also communicates with licensing servers to ensure that the virtual server rack 206 has up-to-date licenses in place for components of the virtual server rack 206. The example logical object generation engine 528 is provided to generate logical objects for different portions of the physical hardware resources 224, 226 so that the logical objects can be used to provision logical resources based on the physical hardware resources 224, 226. The example event process manager 530 is provided to manage instances of different processes running in the virtual server rack 206. The example VRM directory 532 is provided to track identities and availabilities of logical and physical resources in the virtual server rack 206. For example, the virtual rack manager directory 532 may maintain mappings of logical resources (e.g., virtual resources) to the physical hardware resources 224, 226. For example, the virtual rack manager directory 532 may identify what (if any) virtual resources (e.g., virtual machines) are provided by the different physical hardware resources 224, 226.

The example extensibility tools 534 are provided to facilitate extending capabilities of the virtual server rack 206 by adding additional components such as additional physical racks to form the virtual server rack 206. The example VRM data store 536 is provided to store configuration information, provisioning information, resource allocation information, and/or any other information used by the VRM 225, 227 to manage hardware configurations, logical configurations, workflows, services, etc. of the virtual server rack 206. For example, the virtual rack manager data store 536 may store state information of the virtual server rack 206 and/or a subset of physical hosts included in the virtual server rack 206 (e.g., a cluster of hosts), workload profiles, service level agreements for a workload, mappings of logical resources to physical resources, state information, etc.

In the illustrated example, the VRM 225, 227 may be configured by an administrator that accesses the VRM 225, 227 through an example VRM portal 540 that is a web-based interface that provides access to one or more of the components of the VRM 225, 227.

In the illustrated example, the operations and management layer 406 is in communication with the VRM 225, 227 via the API interface 506 to provide different services such as heat-map service, capacity planner service, maintenance planner service, events and operational view service, and virtual rack application workloads manager service. In the illustrated example, the network virtualization manager 304 and the vCenter server 510 are in communication with the VRM 225, 227 to instantiate, manage, and communicate with virtual networks and virtual infrastructures. For example, the network virtualization manager 304 of the illustrated example virtualizes network resources such as physical hardware switches to provide software-based virtual networks. The example vCenter server 510 provides a centralized and extensible platform for managing virtual infrastructures. For example, the vCenter server 510 provides centralized management of virtual hosts and virtual machines from a single console. The vCenter server 510 of the illustrated example communicates with the VRM 225, 227 via the API interface 508 to provide administrators with views of and access to configurations of the virtual server rack 206. In the illustrated example, the VRM 225, 227 provides a web page user interface by which the administrator can view, access and/or modify the configurations of the virtual server rack 206. For example, the VRM 225, 227 may provide a web page user interface by which the administrator can retire a physical host in the virtual server rack 206.

Figure 6:
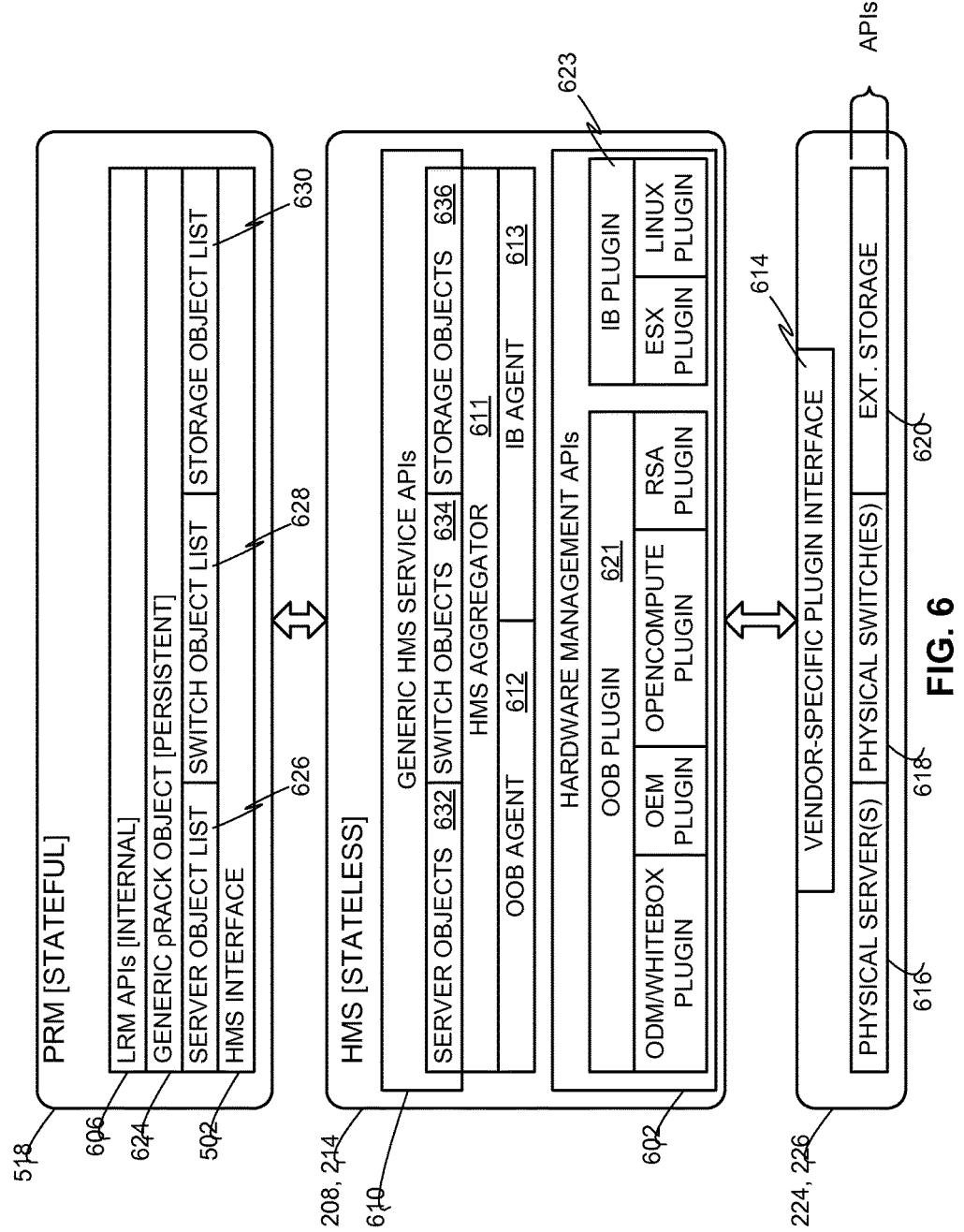
FIG. 6 depicts an example hardware management application program interface (API) of the HMS of FIGS. 2-5 that is between example hardware resources and an example physical rack resource manager (PRM).

FIG. 6 depicts example hardware management application program interfaces (APIs) 602 of the HMS 208, 214 of FIGS. 2-5 that are between the example physical hardware resources 224, 226 of FIGS. 2-5 and the example PRM 518. The example PRM 518 is a component of the VRM 225, 227 (FIGS. 4 and 5) in the software stack of the virtual server rack 206 (FIG. 2). An example PRM 518 is provided in each physical rack 202, 204 and is configured to manage corresponding physical hardware resources 224, 226 of the corresponding physical rack 202, 204 (FIG. 2) and to maintain a software physical rack object for the corresponding physical rack 202, 204. The example PRM 518 interfaces with the corresponding HMS 208, 214 of the same physical rack 202, 204 to manage individual physical hardware resources 224, 226. In some examples, the PRM 518 runs an HMS monitor thread (e.g., similar or part of the HMS monitor 422 of FIG. 4) to monitor a management switch 207, 213 that runs the HMS 208, 214 for Type 4 and Type 5 failures shown in Table 1 above. In some examples, the HMS monitor thread in the PRM 518 also monitors for some Type 3 failures shown in Table 1 above when an OS of the management switch 207, 213 needs external intervention.

In the illustrated example, the PRM 518 provides a set of LRM API's 606 for use of the physical rack object by the example LRM 520 (FIG. 5). The example LRM 520 interacts with individual PRM 518 instances to employ physical resources based on physical resource requirements of the LRM 520. In some examples, the PRM 518 runs as part of an LRM application on a given server node in a virtual server rack 206. In the illustrated example, the LRM 520 is implemented using Java on Linux. However, any other programming language and any other operating system may be used. The PRM 518 of the illustrated example runs in an x86-based Linux Virtual Machine environment as part of the VRM 225, 227 on a designated server node in the physical rack 202, 204.

In the illustrated example of FIG. 6, the HMS 208, 214 publishes a set of generic HMS service APIs 610 for use by original equipment manufacturers (OEMs) to integrate hardware or software with the software stack of the virtual server rack 206. In the illustrated example, the integration point for OEM components is the hardware management APIs 602. In the illustrated example, vendor-specific plugin interfaces 614 may be developed for use by the hardware management API 602 to facilitate communications with physical hardware resources 224, 226 of particular vendors having vendor-specific interfaces. In the illustrated example, such vendor-specific plugin interfaces 614 interface to corresponding physical hardware resources 224, 226 using interface protocols supported by the underlying hardware components (e.g., an IPMI API, a representational state transfer (REST) API, an extensible markup language (XML) API, a hypertext transfer protocol (HTTP) API, a customer information model (CIM) API, etc.). In the illustrated example, the physical hardware resources 224, 226 are shown as one or more physical server(s) 616, one or more physical switch(es) 618, and external storage 620. The physical switches 618 of the illustrated example include the management switch 207, 213 and the ToR switches 210, 212, 216, 218 of FIG. 2.

In the illustrated example, the HMS 208, 214 provides the set of example generic HMS service APIs 610 for use by the PRM 518 to access use of virtual resources based on the physical hardware resources 224, 226. In the illustrated example, the generic HMS service APIs 610 are not specific to any particular vendor and/or hardware and are implemented using a REST/JSON (JavaScript object notation) API protocol. However, any other API protocol may be used. The example generic HMS service APIs 610 act on the underlying physical hardware resources 224, 226, which are encapsulated in a set of software objects such as server objects 632, switch objects 634, and storage objects 636. In the illustrated example, the HMS 208, 214 maintains the server objects 632, the switch objects 634, and the storage objects 636, and their associated properties. In the illustrated example, the HMS 208, 214 runs the generic HMS service APIs 610 on the example server host node(0) 209, 211 (FIG. 2) to interface with the example PRM 518 and to an example HMS aggregator 611. The example HMS aggregator 611 runs on the example server host node(0) 209, 211 to aggregate data from an example OOB agent 612 and an example IB agent 613 to expose such data to the PRM 518 and, thus, the VRM 225, 227 (FIGS. 2, 4, and 5). In addition, the HMS aggregator 611 obtains data from the PRM 518 and parses the data out to corresponding ones of the OOB agent 612 for communicating to the physical hardware resources 224, 226, and to the IB agent 613 for communicating to software components. In the illustrated example, the OOB agent 612 runs on the management switch 207, 213, and the IB agent 613 runs on the server host node(0) 209, 211. The example OOB agent 612 interfaces with the physical resources 224, 226 and interfaces with the HMS aggregator 611. The example IB agent 613 interfaces with operating systems and interfaces with the HMS aggregator 611. That is, in the illustrated example, the OOB agent 612 is configured to communicate with vendor hardware via vendor-specific interfaces. The example IB agent 613 is configured to communicate with OS-specific plugins and does not communicate directly with hardware. Instead, the IB agent 613 communicates with operating systems to obtain information from hardware when such information cannot be obtained by the OOB agent 612. For example, the OOB agent 612 may not be able to obtain all types of hardware information (e.g., hard disk drive or solid state drive firmware version). In such examples, the IB agent 613 can request such hardware information from operating systems.

In examples disclosed herein, server and switch plugin APIs are to be implemented by vendor-supplied plugins for vendor-specific hardware. For example, such server and switch plugin APIs are implemented using OOB interfaces according to an HMS specification. For vendor-specific plugin interfaces 614 that do not support OOB communication based on the vendor-supplied plugin, the HMS 208, 214 implements an IB plugin 623 to communicate with the vendor's hardware via an operating system plugin using IB communications. For example, the IB plugin 623 in the HMS 208, 214 interfaces to the operating system running on the server node (e.g., the server node implemented by the vendor's hardware) using an OS-provided mechanism such as OS APIs (e.g., vSphere APIs), OS command line interfaces (CLI) (e.g., ESX CLI), and/or Distributed Management Task Force (DMTF) Common Information Model (CIM) providers.

The example HMS 208, 214 internally maintains the hardware management API 602 to service API requests received at the generic HMS service APIs 610. The hardware management API 602 of the illustrated example is vendor-specific and is implemented as a vendor-specific plugin to the HMS 208, 214. The hardware management API 602 includes example OOB plugins 621 to interface with vendor-specific plugin interfaces 614 to communicate with the actual physical hardware resources 224, 226. For example, the OOB plugin 621 interfaces with the example OOB agent 612 to exchange data between the generic HMS service APIs 610 and the vendor-specific plugin interface 614. Example vendor-specific interfaces 614 may be proprietary to corresponding OEM vendors for hardware management. Regardless of whether the vendor-specific interfaces 614 are proprietary, or part of an industry standard or open interface, the published hardware management API 602 is configured to work seamlessly between the PRM 518 and the physical hardware resources 224, 226 to manage the physical hardware resources 224, 226. To communicate with the physical hardware resources 224, 226 via operating systems, the hardware management API 602 is provided with an example IB plugin 623. That is, in the illustrated example, the IB plugin 623 operates as an OS plugin for the IB agent 613 to communicate with operating systems.

In the illustrated examples, the HMS 208, 214 uses the example OOB agent 612 and the example OOB plugin 621 for OOB management of the physical hardware resources 224, 226, and uses the example IB agent 613 and the example IB plugin 623 for IB management of the physical hardware resources 224, 226. In examples disclosed herein, OOB components such as the OOB agent 612 and the OOB plugin 621 run in the management switch 207, 213, and IB components such as the IB agent 613, the IB plugin 623, the generic HMS service APIs 610, and the HMS aggregator run 611 in the server host node(0) 209, 211. Such separation of IB management and OOB management components of the HMS 208, 214 facilitates increased resiliency of HMS 208, 214 in case of failure of either of the IB management channel or the OOB management channel. Such IB and OOB management separation also simplifies the network configuration of the ToR switches 210, 212, 216, 218 (FIGS. 2 and 3) and keeps the management network isolated for security purposes. In examples disclosed herein, a single generic API interface (e.g., a REST API, a JSON API, etc.) implementing the example generic HMS service APIs 610 is provided between the PRM 518 and the HMS 208, 214 to facilitate hiding all hardware and vendor specificities of hardware management in the HMS 208, 214 and isolating the complexity of such hardware and vendor specificities from upper layer processes in the PRM 518 and/or a LRM 520.

In examples disclosed herein, the HMS 208, 214 uses an IPMI/DCMI (Data Center Manageability Interface) for OOB management. Example OOB operations performed by the HMS 208, 214 include discovery of new hardware, bootstrapping, remote power control, authentication, hard resetting of non-responsive hosts, monitoring catastrophic hardware failures, and firmware upgrades. In examples disclosed herein, an Integrated BMC (baseboard management controller) Embedded local area network (LAN) channel is used for OOB management of server hosts 616. In examples disclosed herein, one dedicated interface is enabled for OOB management traffic. In such examples, the interface is enabled for dynamic host configuration protocol (DHCP) and connected to a management switch (e.g., the management switch 207, 213 running the HMS 208, 214). In examples disclosed herein, an administrative user is created to operate the dedicated interface for OOB management traffic. An example HMS OOB thread uses IPMI commands to discover and manage server nodes 616 over the dedicated interface for OOB management traffic. Example IPMI features that may be used over the Integrated BMC Embedded LAN for OOB management traffic include the following properties and sensors.

Properties
Device ID
Cold Reset
Get Self Test Results
Set/Get ACPI Power State
Set/Get User Name
Set/Get User Access
Set/Get User Password
Get Chassis Status
Chassis Control Power Down/Up/Power Cycle/Hard Reset
Chassis Identity
Set/Get System Boot Options
Get System Restart Cause
Set/Get LAN configuration
DHCP Host Name
Authentication Type Support
Authentication Type Enable
Primary RMCP Port Number
Default Gateway
Sensors
Power Unit Status
BMC Firmware Health
HDD status
Processor Status
Processor DIMM
Processor Temperature The example HMS 208, 214 uses IB management to periodically monitor status and health of the physical resources 224, 226 and to keep server objects 632 and switch objects 634 up to date. In examples disclosed herein, the HMS 208, 214 uses Distributed Management Task Force (DMTF) Common Information Model (CIM) providers in a VMware ESXi™ hypervisor and CIM client for IB management. The CIM is the software framework used for managing hardware devices and services defined by the DMTF and supported in the VMware ESXi™ hypervisor. CIM providers are classes that receive and fulfill client requests dispatched to them by a CIM object manager (CIMOM). For example, when an application requests dynamic data from the CIMOM, it uses the CIM provider interfaces to pass the request to the CIM provider. Example IB operations performed by the HMS 208, 214 include controlling power state, accessing temperature sensors, controlling BIOS (Basic Input/Output System) inventory of hardware (e.g., CPUs, memory, disks, etc.), event monitoring, and logging events. In examples disclosed herein, the main components which the HMS 208, 214 monitors using IB management are I/O devices (e.g., Network Interface Cards, PCI-e interfaces, and Disk Drives). In examples disclosed herein, the HMS 208, 214 uses CIM providers to monitor such I/O devices. Example CIM providers may be developed as VMware ESXi™ hypervisor userworlds to interface with drivers corresponding to I/O devices being monitored to gather data pertaining to those I/O devices. In some examples, the CIM providers are C++ classes, which define sets of objects and corresponding properties for use by the HMS 208, 214 to fetch data from the underlying physical resources 224, 226 (e.g., hardware I/O devices).

The PRM 518 of the illustrated example exposes a physical rack object and its associated sub-objects in a generic vendor neutral manner to the example LRM 520. Example sub-objects of the physical rack object include an example server object list 626 (e.g., a list of servers), an example switch object list 628 (e.g., a list of switches), and a storage object list 630 (e.g., a list of external storage). The example PRM 518 communicates with the example HMS 208, 214 using the example generic HMS service APIs 610 to manage physical resources (e.g., hardware) in the physical rack 202, 204, and to obtain information and inventory of physical resources available in the physical rack 202, 204. In the illustrated example, the HMS 208, 214 executes instructions from the PRM 518 that are specific to underlying physical resources based on the hardware management APIs 602 of those physical resources. That is, after the HMS 208, 214 receives an instruction via a generic HMS service APIs 610 from the PRM 518 that corresponds to an action on a particular physical resource in the physical rack 202, 204, the HMS 208, 214 uses the example hardware management APIs 602 to issue a corresponding instruction to the particular physical resource using a hardware management API of that particular physical resource. In this manner, the PRM 518 need not be configured to communicate with numerous different APIs of different physical resources in the physical rack 202, 204. Instead, the PRM 518 is configured to communicate with the HMS 208, 214 via the generic HMS service APIs 610, and the HMS 208, 214 handles communicating with numerous different, specific APIs of different physical resources through the example hardware management API 602. By using the generic HMS service APIs 610 for the PRM 518 to interface with and manage physical resources through the HMS 208, 214, the physical racks 202, 204 may be configured or populated with hardware from numerous different manufacturers without needing to significantly reconfigure the PRM 518. That is, even if such manufacturers require use of different APIs specific to their equipment, the HMS 208, 214 is configured to handle communications using such different APIs without changing how the PRM 518 uses the generic HMS service APIs 610 to communicate with the physical resources via the HMS 208, 214. Thus, the separation of the example generic HMS service APIs 610 from the example hardware management API 602 allows the HMS 208, 214 to integrate seamlessly with hardware from ODMs, OEMs, and other vendors independently of the generic HMS service APIs 610 provided by the HMS 208, 214 for use by the PRM 518 to manage such hardware.

The generic HMS service APIs 610 of the illustrated example supports numerous Get/Set events so that the HMS 208, 214 can support requests from the PRM 518. Such Get/Set events will work on software server and switch object properties. Example Get/Set events of the generic HMS service APIs 610 include:

PRM_HMS_ACK_HANDSHAKE ( )
PRM_HMS_GET_RACK_INVENTORY (Server Obj[ ], Switch Obj[ ], . . . )
PRM_HMS_GET_SERVER_OBJECT_PROP (Key, Value)
PRM_HMS_SET_SERVER_OBJECT_PROP (Key, Value)
PRM_HMS_GET_SWITCH_OBJECT_PROP (Key, Value)
PRM_HMS_SET_SWITCH_OBJECT_PROP (Key, Value)

In the above example Get/Set events of the generic HMS service APIs 610, the 'Key' is the property ID listed as part of the server/switch object properties. The example PRM_HMS_ACK_HANDSHAKE ( ) event API enables the PRM 518 to perform an acknowledgment-based handshake with the HMS 208, 214 to establish a connection between the PRM 518 and the HMS 208, 214. The example PRM_HMS_GET_RACK_INVENTORY (Server Obj[ ], Switch Obj[ ], . . . ) API enables the PRM 518 to request the HMS 208, 214 to provide the hardware inventory of the physical rack 202, 204. The example PRM_HMS_GET_SERVER_OBJECT_PROP (Key, Value) API enables the PRM 518 to request a server object property from the HMS 208, 214. For example, the PRM 518 provides the 'Key' identifying the requested server object property ID, and the HMS 208, 214 returns the 'Value' of the requested server object property. The example PRM_HMS_SET_SERVER_OBJECT_PROP (Key, Value) API enables the PRM 518 to set a server object property via the HMS 208, 214. For example, the PRM 518 provides the 'Key' identifying the target server object property ID, and provides the 'Value' to set for the target server object property. The example PRM_HMS_GET_SWITCH_OBJECT_PROP (Key, Value) API enables the PRM 518 to request a switch object property from the HMS 208, 214. For example, the PRM 518 provides the 'Key' identifying the requested switch object property ID, and the HMS 208, 214 returns the 'Value' of the requested switch object property. The example PRM_HMS_SET_SWITCH_OBJECT_PROP (Key, Value) API enables the PRM 518 to set a switch object property via the HMS 208, 214. For example, the PRM 518 provides the 'Key' identifying the target switch object property ID, and provides the 'Value' to set for the target switch object property.

The PRM 518 of the illustrated example registers a set of callbacks with the HMS 208, 214 that the PRM 518 is configured to use to receive communications from the HMS 208, 214. When the PRM callbacks are registered, the HMS 208, 214 invokes the callbacks when events corresponding to those callbacks occur. Example PRM callback APIs that may be registered by the PRM 518 as part of the generic HMS service APIs 610 include:

PRM Callback APIs
HMS_PRM_HOST_FAILURE (Server Obj[ ], REASON CODE)
HMS_PRM_SWITCH_FAILURE (Switch Obj[ ], REASON CODE)
HMS_PRM_MONITOR_SERVER_OBJECT (Key, Value, Update Frequency)
HMS_PRM_MONITOR_SWITCH_OBJECT (Key, Value, Update Frequency)

The example HMS_PRM_HOST_FAILURE (Server Obj[ ], REASON CODE) callback enables the HMS 208, 214 to notify the PRM 518 of a failure of a host (e.g., a physical server) in the physical rack 202, 204. The example HMS_PRM_SWITCH_FAILURE (Switch Obj[ ], REASON CODE) callback enables the HMS 208, 214 to notify the PRM 518 of a failure of a switch of the physical rack 202, 204. The example HMS_PRM_MONITOR_SERVER_OBJECT (Key, Value, Update Frequency) callback enables the HMS 208, 214 to send monitor updates to the PRM 518 about a server object. In the illustrated example, 'Key' identifies the server object to which the update corresponds, 'Value' includes the updated information monitored by the HMS 208, 214 for the server object, and 'Update Frequency' indicates the frequency with which the server object monitor update callbacks are provided by the HMS 208, 214 to the PRM 518. The example HMS_PRM_MONITOR_SWITCH_OBJECT (Key, Value, Update Frequency) callback enables the HMS 208, 214 to send monitor updates to the PRM 518 about a switch object. In the illustrated example, 'Key' identifies the switch object to which the update corresponds, 'Value' includes the updated information monitored by the HMS 208, 214 for the switch object, and 'Update Frequency' indicates the frequency with which the switch object monitor update callbacks are provided by the HMS 208, 214 to the PRM 518.

The example generic HMS service APIs 610 provide non-maskable event types for use by the HMS 208, 214 to notify the PRM 518 of failure scenarios in which the HMS 208, 214 cannot continue to function.

Non-Maskable Event HMS APIs
HMS_SOFTWARE_FAILURE (REASON CODE)
HMS_OUT_OF_RESOURCES (REASON CODE)

The example HMS_SOFTWARE_FAILURE (REASON CODE) non-maskable event API enables the HMS 208, 214 to notify the PRM 518 of a software failure in the HMS 208, 214. The example HMS_OUT_OF_RESOURCES (REASON CODE) non-maskable event API enables the HMS 208, 214 to notify the PRM 518 when the HMS 208, 214 is out of physical resources.

The HMS 208, 214 provides the example hardware management APIs 602 for use by the example generic HMS service APIs 610 so that the HMS 208, 214 can communicate with the physical resources 224, 226 based on instructions received from the PRM 518 via the generic HMS service APIs 610. The hardware management APIs 602 of the illustrated example interface with physical resource objects using their corresponding management interfaces, some of which may be vendor-specific interfaces. For example, the HMS 208, 214 uses the hardware management APIs 602 to maintain managed server, switch, and storage software object properties. Example hardware management APIs 602 for accessing server objects are shown below in Table 2.

TABLE 2

Server Hardware Management APIs

| API | Return Value | Description |
| --- | --- | --- |
| DISCOVER_SERVER_INVENTORY( ) A Node Object identifies a server hardware node (Node ID, MAC Address, Management IP Address) | Node object list | Used to discover all servers in a rack. Homogeneous hardware assumption Board information required for hardware identification to attach to the right plugin. |
| GET_CHASSIS_SERIAL_NUMBER (NODE_OBJECT) | Chassis serial number | Used to get chassis identifier |
| GET_BOARD_SERIAL_NUMBER (NODE_OBJECT) | Board serial number | Used to get board identifier |
| GET_MANAGEMENT_MAC_ADDR (NODE_OBJECT) | MAC address | Used to get MAC address of management port |
| SET_MANAGEMENT_IP_ADDR(NODE_OBJECT, IPADDR) | RC (Success/ Error Code) | Used to set management IP address |
| GET_CPU_POWER_STATE(NODE_OBJECT) | CPU powerstate | Used to get current power state [S0-S5] of CPU |
| SET_CPU_POWER_STATE(NODE_OBJECT, POWERSTATE) | RC | Used to set CPU power state |
| SET_SERVER_POWER_STATE(ON/OFF/CYCLE/ RESET) | RC | Used to power on, power off, power cycle, reset a server Cold reset -BMC reset, run Self Test Warm Reset - No Self Test |
| GET_SERVER_CPU_PROPERTIES(NODE_OBJECT, CPU_OBJECT) | RC | Used to get CPU specific information |
| SET_SERVER_CPU_PROPERTIES(NODE _OBJECT, CPU_OBJECT) | RC | Used to set CPU properties |
| GET_SERVER_MEMORY_PROPERTIES(NODE_ OBJECT, MEM_OBJECT) | RC | Used to get memory properties |
| GET_SERVER_NETWORKCONTROLLER_ PROPERTIES (NODE_OBJECT, NETWORKCONTROLLER_OBJECT [ ]) | RC | Used to get Network controller properties including LOM, NICS |
| SET_SERVER_NETWORKCONTROLLER_ PROPERTIES (NODE_OBJECT, NETWORKCONTROLLER_OBJECT[ ]) | RC | Used to set NIC properties |
| GET_SERVER_DISK_PROPERTIES(NODE_ OBJECT, DISK_OBJECT[ ]) | RC | Used to get Disk properties |
| SET_SERVER_DISK_PROPERTIES(NODE_ OBJECT, DISK_OBJECT[ ]) | RC | Used to set Disk properties |
| GET_SERVER_DISK_SMART_DATA(NODE_ OBJECT, SMART_OBJECT) | RC | Used to get SMART data for disk |
| SET_SERVER_SENSOR (NODE_OBJECT, SENSOR, VALUE, THRESHOLD) | RC | Used to set sensors for CPU/Memory/Power/ HDD |
| GET_SENSOR_STATUS (NODE_OBJECT, SENSOR, VALUE, UNITS, THRESHOLD) | RC | Used to get sensor data |
| GET_SYSTEM_EVENT_LOG_DATA(. . .) | Used to get System event log data | |
| UPDATE_CPU_FIRMWARE(FILE . . .) | Update CPU firmware | |
| UPDATE_DISK_FIRMWARE(FILE . . .) | Update Disk Firmware | |
| UPDATE_NIC_FIRMWARE(FILE . . .) | Update NIC firmware | |
| SET_CHASSIS_IDENTIFICATION (NODE_OBJECT, ON/OFF, NUMSECS) | LED/LCD/ BEEP | |
| SET_BOOTOPTION(NODE_OBJECT, TYPE) | RC | Used to set bootoption SSD/PXE |
| GET_BOOTOPTION(NODE_OBJECT) | BOOT TYPE | Used to get bootoption |
| SET_CREATE_USER (NODE_OBJECT, USEROBJECT) | RC | Used to create a management user |

Example hardware management APIs 602 for accessing switch objects are shown below in Table 3.

TABLE 3

Switch Hardware Management APIs

| API | Return Value | Description |
| --- | --- | --- |
| GET_CHASSIS_SERIAL_ID (NODE_OBJECT) | CHASSIS_IDENTIFIER | Used to identify a ToR Switch chassis |
| GET_MANAGEMENT_MAC (NODE_OBJECT) | MAC_ADDRESS | API to get Management port MAC address |
| SET_MANAGEMENT_IP (NODE_OBJECT, IPADDR) | RC | API to set management IP address |
| GET_SWITCH_INVENTORY (NODE_OBJECT) | SWITCH_INVENTORY | Used to get switch hardware inventory (HW, Power supply, Fans, Transceiver etc.) |
| SWITCH_REBOOT (NODE_OBJECT) | RC | Used to reboot the switch |
| CREATE_SWITCH_USER (NODE_OBJECT, USER_OBJECT) | RC | Used to create a management user |
| GET_SWITCH_VERSION (NODE_OBJECT) | VERSION_OBJECT | Used to get Hardware and software version details |
| GET_SWITCH_HW_PLATFORM (NODE_OBJECT) | HARDWARE_CHIPSET_OBJECT | Used to get the switching ASIC information |
| APPLY_SWITCH_CONFIGURATION (NODE_OBJECT, CONFIG_FILE) | CONFIG_STATUS_OBJECT | Used to apply running configuration on a switch |
| DELETE_SWITCH_CONFIGURATION (NODE_OBJECT) | RC | Used to delete startup switch configuration |
| SET_LOG_LEVELS (NODE_OBJECT, LOG_LEVEL) | RC | Used to set log levels for alert, events and debug from the switch |
| GET_SWITCH_ENVIRONMENT (NODE_OBJECT, POWER_OBJ, COOLING_OBJ, TEMPERATURE_OBJ) | RC | Used to get environmental information from the switch for power, fans and temperature. |
| SET_LOCATOR_LED (NODE_OBJECT) | RC | Used to set locator LED of switch |
| GET_INTERFACE_COUNTERS (NODE_OBJECT, INT_OBJECT) | RC | Used to collect interface statistics |
| GET_INTERFACE_ERRORS (NODE_OBJECT, INT_OBJECT) | RC | Used to collect errors on switch interfaces |
| GET_INTERFACE_STATUS (NODE_OBJECT, INT_OBJECT) | RC | Used to get interface status |
| SET_INTERFACE_STAUS (NODE_OBJECT, INT_OBJECT) | RC | Used to set interface status |
| GET_INTERFACE_PHY_STATUS (NODE_OBJECT, INT_OBJECT) | RC | Used to get physical status of interface |
| GET_INTERFACE_SPEED (NODE_OBJECT, INT_OBJECT") | RC | Used to get the speed/auto negotiation mode |
| GET_VLAN_SUMMARY (NODE_OBJECT, VLAN_OBJECT) | RC | Get VLAN information Number of VLAN in use and ports connected to. |
| GET_VLAN_COUNTERS (NODE_OBJECT, VLAN_OBJECT) | RC | Get VLAN specific counters |
| GET_VXLAN_TABLE (NODE_OBJECT, VXLAN_TABLE) | RC | VXLAN address table |
| GET_VXLAN_COUNTERS (NODE_OBJECT, VXLAN_OBJECT) | RC | VXLAN specific counters |
| CLEAR_VLAN_COUNTERS | RC | Clear VLAN counters |
| CLEAR_VXLAN_COUNTERS | RC | Clear VXLAN counters |
| MONITOR_LINK_FLAPS (NODE_OBJECT, INT_OBJECT) | RC | Monitor link flaps |
| L3/MLAG/LAG STATUS SET_PORT_MTU (NODE_OBJECT, MTU) | RC | Set Port MTU |
| SWITCH_OS_UPGRADE(FILE *) | RC | Ability to upgrade the OS on the switch |

In the illustrated example of FIG. 6, the PRM 518 maintains an example generic pRack object 624. The example generic pRack object 624 persists a list of the physical resources 224, 226 returned by the HMS 208, 214 and classified according to object types. The example generic pRack object 624 includes the following pRack object definition.

pRACK Object
Rack ID (Logical Provided by VRM 225, 227)
Manufacturer ID ( )
Number Server Objects
Server Object List 626
Switch Object List 628
HMS heartbeat timestamp In the pRack object definition above, the Rack ID is the logical identifier of the virtual server rack 206 (FIG. 2). The Manufacturer ID ( ) returns the identifier of the system integrator 104 (FIG. 1) that configured the virtual server rack 206. The 'Number Server Objects' element stores the number of server objects configured for the virtual server rack 206. The 'Server Object List' 626 element stores a listing of server objects configured for the virtual server rack 206. The 'Switch Object List' 628 element stores a listing of switch objects configured for the virtual server rack 206. The 'HMS heartbeat timestamp' element stores timestamps of when the operational status (e.g., heartbeat) of the virtual server rack 206 is checked during periodic monitoring of the virtual server rack 206.

The example PRM 518 provides the LRM APIs 606 for use by the LRM 520 (FIG. 5) to access the elements above of the pRack object 624. In examples disclosed herein, the PRM 518 and the LRM 520 run in the same application. As such, the PRM 518 and the LRM 520 communicate with each other using local inter-process communication (IPC). Examples of Get/Set event APIs of the LRM APIs 606 include:

Get/Set Event LRM APIs
LRM_PRM_RECIEVE_HANDSHAKE_ACK ( )
LRM_PRM_GET_RACK_OBJECT (PRM_RACK_OBJECT [ ])
LRM_PRM_SET_SERVER_OBJECT_PROP (Key, Value)
LRM_PRM_GET_SERVER_STATS (Available, InUse, Faults)
LRM_PRM_SET_SERVER_CONFIG (SERVER_CONFIG_BUFFER)
LRM_PRM_SET_SWITCH_ADV_CONFIG (SWITCH_CONFIG_BUFFER)

In the Get/Set Event LRM APIs, the example LRM_PRM_RECIEVE_HANDSHAKE_ACK 0 API may be used by the LRM 520 to establish a connection between the LRM 520 and the PRM 518. The example LRM_PRM_GET_RACK_OBJECT (PRM_RACK_OBJECT [ ]) API may be used by the LRM 520 to obtain an identifier of the rack object corresponding to the virtual server rack 206. The example LRM_PRM_SET_SERVER_OBJECT_PROP (Key, Value) API may be used by the LRM 520 to set a server object property via the PRM 518. For example, the LRM 520 provides the 'Key' identifying the target server object property ID, and provides the 'Value' to set for the target server object property. The example LRM_PRM_GET_SERVER_STATS (Available, InUse, Faults) API may be used by the LRM 520 to request via the PRM 518 operational status of servers of the physical resources 224, 226. For example, the PRM 518 may return an 'Available' value indicative of how many servers in the physical resources 224, 226 are available, may return an 'InUse' value indicative of how many servers in the physical resources 224, 226 are in use, and may return a 'Faults' value indicative of how many servers in the physical resources 224, 226 are in a fault condition. The example LRM_PRM_SET_SERVER_CONFIG (SERVER_CONFIG_BUFFER) API may be used by the LRM 520 to set configuration information in servers of the physical resources 224, 226. For example, the LRM 520 can pass a memory buffer region by reference in the 'SERVER_CONFIG_BUFFER' parameter to indicate a portion of memory that stores configuration information for a server. The example LRM_PRM_SET_SWITCH_ADV_CONFIG (SWITCH_CONFIG_BUFFER) may be used by the LRM 520 to set configuration information in switches of the physical resources 224, 226. For example, the LRM 520 can pass a memory buffer region by reference in the 'SWITCH_CONFIG_BUFFER' parameter to indicate a portion of memory that stores configuration information for a switch.

The LRM 520 of the illustrated example registers a set of callbacks with the PRM 518 that the LRM 520 is configured to use to receive communications from the PRM 518. When the LRM callbacks are registered, the PRM 518 invokes the callbacks when events corresponding to those callbacks occur. Example callbacks that may be registered by the LRM 520 include:

LRM Callback APIs
PRM_LRM_SERVER_DOWN (SERVER_ID, REASON_CODE)
PRM_LRM_SWITCH_PORT_DOWN (SERVER_ID, REASON_CODE)
PRM_LRM_SERVER_HARDWARE_FAULT (SERVER_ID, REASON CODE)

The example PRM_LRM_SERVER_DOWN (SERVER_ID, REASON_CODE) callback API enables the PRM 518 to notify the LRM 520 when a server is down. The example PRM_LRM_SWITCH_PORT_DOWN (SERVER_ID, REASON_CODE) callback API enables the PRM 518 to notify the LRM 520 when a switch port is down. The example PRM_LRM_SERVER_HARDWARE_FAULT (SERVER_ID, REASON_CODE) callback API enables the PRM 518 to notify the PRM 518 to notify the LRM 520 when a server hardware fault has occurred.

The example generic HMS service APIs 610 provide non-maskable event types for use by the HMS 208, 214 to notify the PRM 518 of failure scenarios in which the HMS 208, 214 cannot continue to function.

Non-Maskable Event LRM APIs
PRM_SOFTWARE_FAILURE (REASON_CODE)
PRM_OUT_OF_RESOURCES (REASON_CODE)

The example PRM_SOFTWARE_FAILURE (REASON_CODE) non-maskable event API enables the PRM 518 to notify the LRM 520 when a software failure has occurred. The example PRM_OUT_OF_RESOURCES (REASON_CODE) non-maskable event API enables the PRM 518 to notify the LRM 520 when the PRM 518 is out of resources.

An example boot process of the virtual server rack 206 (FIGS. 2 and 4) includes an HMS bootup sequence, a PRM bootup sequence, and an HMS-PRM initial handshake. In an example HMS bootup sequence, when the management switch 207, 213 on which the HMS 208, 214 runs is powered-on and the OS of the management switch 207, 213 is up and running, a bootstrap script to initialize the HMS 208, 214 is executed to fetch and install an HMS agent software installer on the management switch 207, 213 to instantiate the HMS 208, 214. The HMS agent software installer completes install and initialization of the HMS agent software bundle and starts the HMS agent daemon to instantiate the HMS 208, 214. When the HMS agent daemon is started, the HMS 208, 214 determines the inventory of the physical resources 224, 226 of the physical rack 202, 204. It does this by using an IPMI discover API which sends broadcast remote management control protocol (RMCP) pings to discover IPMI-capable nodes (e.g., nodes of the physical resources 224, 226) on a known internal subnet. In such examples, management IP addresses for server nodes (e.g., server nodes of the physical resources 224, 226) and ToR switches (e.g., ToR switches 210, 212, 216, 218) will be known apriori and published for the HMS 208, 214 to discover as internal DHCP address ranges. For example, the server hosts and the ToR switches 210, 212, 216, 218 may be assigned IP addresses using a DHCP server running on the same management switch 207, 213 that runs the HMS 208, 214.

In an example PRM bootup sequence, the PRM 518 boots up as part of the VRM 225, 227. The example VRM 225, 227 initiates the PRM 518 process. During bootup, the example PRM 518 creates an empty physical rack object and waits for the HMS 208, 214 to initiate an HMS-PRM initial handshake. When the HMS-PRM initial handshake is successful, the example PRM 518 queries the HMS 208, 214 for the physical inventory (e.g., the inventory of the physical resources 224, 226) in the physical rack 202, 204. The PRM 518 then populates the physical rack object based on the physical inventory response from the HMS 208, 214. After the HMS-PRM initial handshake with the HMS 208, 214 and after the physical rack object initialization is complete, the example PRM 518 sends a message to the LRM 520 to indicate that the PRM 518 is ready for accepting requests. However, if initialization does not succeed after a certain time period, the example PRM 518 notifies the LRM 520 that the pRack initialization has failed.

In examples disclosed herein, the HMS 208, 214 initiates the HMS-PRM initial handshake during the PRM bootup sequence to establish a connection with the PRM 518. In examples disclosed herein, when the VM hosting the VRM 225, 227 is up and running the VM creates a virtual NIC for the internal network of the virtual server rack 206 and assigns an IP address to that virtual NIC of the internal network. The ToR switch 210, 212, 216, 218 discovers how to reach and communicate with internal network of the VRM 225, 227 when the VM hosting the VRM 225, 227 powers on. In examples disclosed herein, a management port of the management switch 207, 213 is connected to the ToR switches 210, 212, 216, 218. The management port is used to manage the ToR switches 210, 212, 216, 218. In addition, the management switch 207, 213 is connected to the ToR switches 210, 212, 216, 218 over data ports and communicate using an internal VLAN network. The example VRM 225, 227 and the HMS 208, 214 can then communicate based on a predefined IP address/port number combination. For example, the HMS 208, 214 initiates the HMS-PRM initial handshake by sending a message to the predefined IP address/port number combination of the PRM 518, and the PRM 518 responds with an acknowledge (ACK) to the message from the HMS 208, 214 to complete the HMS-PRM initial handshake.

After the HMS bootup sequence, the HMS 208, 214 performs an initial discovery process in which the HMS 208, 214 identifies servers, switches, and/or any other hardware in the physical resources 224, 226 in the physical rack 202, 204. The HMS 208, 214 also identifies hardware configurations and topology of the physical resources in the physical rack 202, 204. To discover servers in the physical resources 224, 226, the example HMS 208, 214 uses IPMI-over-LAN, which uses the RMCP/RMCP+'Remote Management Control Protocol' defined by DMTF. In examples disclosed herein, RMCP uses port 623 as the primary RMCP port and 664 as a secure auxiliary port, which uses encrypted packets for secure communications. The example HMS 208, 214 uses an RMCP broadcast request on a known subnet to discover IPMI LAN nodes. In addition, the HMS 208, 214 uses the RMCP presence ping message to determine IPMI capable interfaces in the physical rack 202, 204. In this manner, by IPMI LAN nodes and IPMI capable interfaces, the HMS 208, 214 discovers servers present in the physical resources 224, 226.

To discover switches in the physical resources 224, 226, a DHCP server running on the management switch 207, 213 assigns management IP addresses to the ToR switches 210, 212, 216, 218. In this manner, the HMS 208, 214 can detect the presence of the ToR switches 210, 212, 216, 218 in the physical rack 202, 204 based on the management IP addresses assigned by the DHCP server.

To maintain topology information of the management network in the virtual server rack 206, a link layer discovery protocol (LLDP) is enabled on management ports of the discovered server nodes and ToR switches 210, 212, 216, 218. The example management switch 207, 213 monitors the LLDP packet data units (PDUs) received from all of the discovered server nodes and keeps track of topology information. The example HMS 208, 214 uses the topology information to monitor for new servers that are provisioned in the physical resources 224, 226 and for de-provisioning of servers from the physical resources 224, 226. The example HMS 208, 214 also uses the topology information to monitor server hosts of the physical resources 224, 226 for misconfigurations.

The example HMS 208, 214 is capable of power-cycling individual IPMI-capable server hosts in the physical resources 224, 226 of the physical rack 202, 204. For example, the HMS 208, 214 sends SYS POWER OFF and SYS POWER ON messages to the BMCs on boards of target server hosts via LAN controllers of target server hosts. The LAN controllers for the management ports of server hosts are powered on using stand-by power and remain operative when the virtual server rack 206 is powered down. In some examples, the LAN controller is embedded to the system. In other examples, the LAN controller is an add-in PCI card connected to the BMC via a PCI management bus connection.

To hard reset a switch (e.g., the ToR switches 210, 212, 216, 218), the HMS 208, 214 uses IP-based access to power supplies of the physical rack 202, 204. For example, the HMS 208, 214 can hard reset a switch when it is non-responsive such that an in-band power cycle is not possible via the switch's CLI.

During a power cycle, OS images that are pre-stored (e.g., pre-flashed) in the servers and switches of the physical resources 224, 226 are bootstrapped by default. As part of the bootstrap procedure, the HMS 208, 214 points the boot loader to the server or switch image located on a memory device (e.g., a flash memory, a magnetic memory, an optical memory, a Serial Advanced Technology Attachment (SATA) Disk-on-Module (DOM), etc.) and provides the boot loader with any additional parameters pertinent to the bootup of a booting server or switch. For instances in which a network-based boot is required, the HMS 208, 214 is capable of altering boot parameters to use PXE boot for servers and Trivial File Transfer Protocol (TFTP)/Open Network Install Environment (ONIE) for switches.

In examples disclosed herein, after the boot up process the HMS 208, 214 validates that server nodes and the ToR switches 210, 212, 216, 218 have been properly bootstrapped with correct OS images and are ready to be declared functional. The example HMS 208, 214 does this by logging in to the server hosts, validating the OS versions, and analyzing the logs of the server hosts for any failures during bootup. In examples disclosed herein, the HMS 208, 214 also runs basic operability/configuration tests as part of the validation routine. In some examples, the HMS 208, 214 performs a more exhaustive validation to confirm that all loaded drivers are compliant with a hardware compatibility list (HCL) provided by, for example, the virtual system solutions provider 110 (FIG. 1). The example HMS 208, 214 also runs a switch validation routine as part of a switch thread to verify that the boot configurations for the ToR switches 210, 212, 216, 218 are applied. For example, the HMS 208, 214 validates the OS versions in the ToR switches 210, 212, 216, 218 and tests ports by running link tests and ping tests to confirm that all ports are functional. In some examples, the HMS 208, 214 performs more exhaustive tests such as bandwidth availability tests, latency tests, etc.

An example definition of an example server object 632 for use in connection with examples disclosed herein is shown below in Table 4. The example server object 632 defined in Table 4 encapsulates information obtained both statically and dynamically using IB/CIM and OOB/IPMI mechanisms. In examples disclosed herein, the static information is primarily used for resource provisioning, and the dynamic information is used for monitoring status and health of hardware using upper layers in the VRM 225, 227. In some examples, the PRM 518 does not store events or alarms. In such examples, the PRM 518 relays information pertinent to events or alarms to the VRM 225, 227 and/or a Log Insight module (e.g., a module that provides real-time log management for virtual environments).

TABLE 4

Example Definition of Server Object

IPMI Device ID
MAC address of Management Port
IP Address
vRACK Server ID (P0, H0) [Physical Rack 0, Host 0]
Hardware Model
Power State
  On/Off
CPU
  Vendor
  Frequency
  Cores
  HT
  Errors
Memory
  Size
  Type
  Vendor
  ECC
  Cache size
  Status
  Errors
Disk[x]
  Vendor
  Type
  Capacity
  Driver
  Status
  Errors
NIC[x]
  Type 1 G/10 G/40 G
  NumPorts
  Vendor
  Driver
  Linkstate
  ToR Port (P0, S0, X0)(Port number connected on the ToR switch)
  Status
  Errors
Sensors
  Temperature
  Power
Provisioned
  Yes/No
Boot State
  Yes/No
OS Version
Firmware Version
BIOS Version
License TABLE 4-continued Example Definition of Server Object HCL compliant
Timestamps[ ]
  Lastboot
Fault Domain Group An example definition of an example switch object 634 for use in connection with examples disclosed herein is shown below in Table 5. The example switch object 634 defined in Table 5 encapsulates both static and dynamic information. In examples disclosed herein, the static information is primarily used to make sure that network resources are available for a provisioned server host. Also in examples disclosed herein, the dynamic information is used to monitor health of the provisioned physical network. Also in examples disclosed herein, a configuration information buffer is used for switch-specific configurations.

TABLE 5

Example Definition of Switch Object

Chassis ID
MAC Address of Management Port
Management IP Address
vRACK Switch ID (P0, S0) [Physical Rack 0, Switch 0]
Hardware Model
Power State
  On/Off
Provisioned
  Yes/No
Boot State
  Yes/No
Switch Ports[X]
  Speed [1 G/10 G/40 G/100 G]
  Link State [Up/Down]
  Host Port [P0, H0, N1] [Port identifier of the host]
  Historical Stats[ ]
    In/Out Packets
    In/Out Drops
OS Version
Firmware Version
Timestamps
  Lastboot
Fault Domain Group
Switch Configuration File Static [Vendor Type]
(This is a vendor-specific configuration file. This property points to a text file name having a switch configuration. This is bundled as part of the HMS Application (e.g., used to run the HMS 208, 214). The Static Switch Configuration File lists commands to be applied and also files to be copied (e.g., pointers to configuration-specific files).)
Switch Configuration File Dynamic [Vendor Type]
(This is a vendor-specific configuration file. This property points to a text file name having a switch configuration. The Dynamic Switch Configuration File is downloaded at runtime from the PRM 518 of the VRM 225, 227.)

In examples disclosed herein, example server properties managed by the HMS 208, 214 are shown in Table 6 below.

TABLE 6

Server Properties Table

| Property | OOB | IB | Use |
|---|---|---|---|
| Chassis Serial Number | Y | | Used to identify inventory |
| Board Serial Number | Y | | Same as above - second level check |
| Management Mac | Y | | Chassis identifier on the network |

TABLE 6-continued

Server Properties Table

| Property | OOB | IB | Use |
|---|---|---|---|
| Management IP | Y | | Network Connectivity to management port |
| Power State [S0-S5] | Y | | [Low Priority] Only if there is a power surge while provisioning we can set server low power states. |
| Power ON/OFF/ Power Cycle/Reset | Y | | Ability to power on and off servers |
| CPU (Cores, Frequency) | Y | | Use as input for workload resource requirements |
| Memory (Size, Speed, Status) | Y | | As above |
| NIC | Partial | Y | As above (OOB can get MAC address) |
|   Speed | | | |
|   Link Status | | | |
|   Firmware Version | | | |
|   MAC Address | | | |
|   PCI Device ID | | | |
|   PCI SBF | | | |
|   HW capabilities | | | |
|     TSO, | | | |
|     LRO, | | | |
|     VXLAN offloads, | | | |
|     CSUM | | | |
|     DCB | | | |
|     IPV6 | | | |
|     CSUM | | | |
| DISK | Partial | Y | As above (OOB has HDD status sensors described in Sensors) |
|   Size | | | |
|   Device | | | |
|   Availability | | | |
|   Status | | | |
|   Vendor | | | |
|   Model | | | |
|   Type | | | |
|   DeviceID | | | |
|   Driver version | | | |
|   Firmware version | | | |
| SMART data for Disks (Self-Monitoring, Analysis, and Reporting) Value/Threshold | n | | Resiliency algorithm input |
|   Health Status | | | |
|   Media Wearout Indicator | | | |
|   Write Error Count | | | |
|   Read Error Count | | | |
|   Power-on Hours | | | |
|   Power Cycle Count | | | |
|   Raw Read Error Rate | | | |
|   Drive Temperature | | | |
|   Driver Rated Max Temperature | | | |
|   Initial Bad Block Count | | | |
|   SSD specific wearlevelling indicators | | | |
| CPU Firmware version | Y | | Check for updated versions |
| CPU Firmware upgrade | Y | | Ability to upgrade CPU firmware |
| BIOS upgrade | Y | | Ability to upgrade BIOS |
| Sensors (CPU/Memory/Power/HDD) | Y | | HW analytics/OAM |
|   Processor Status (Thermal Trip - Used to identify cause of server reset) | | | |
|   CATERR processor | | | |
|   DIMM Thermal Trip - Same as above | | | |
|   Hang in POST failure - | | | |
|   Processor Status in case of unresponsive CPU | | | |
|   HDD Status | | | |
|   Firmware update status | | | |
|   Power Unit Status (Power Down) | | | |
|   BMC self test | | | |
| POST tests | Y | | Used for HW validation POST errors are logged to SEL |
|   Microcode update failed | | | |
|   Processor init fatal errors | | | |
|   DIMM major failures | | | |
|   DIMM disabled | | | |
|   DIMM SPD failure | | | |
|   BIOS corrupted | | | |
|   PCIe PERR Parity errors | | | |
|   PCIe resource conflict | | | |
|   NVRAM corruptions | | | |
|   Processor BIST failures | | | |
|   BMC controller failed | | | |
|   ME failure | | | |
| (Grizzly pass Technical Product Specification Appendix E has all the POST errors) | | | |
| System Event Logs [SEL] | Y | | LogInsight/HW Analytics Log events for critical hardware failures and critical thresholds |
|   DIMM Thermal Margin critical threshold | | | |
|   Power Supply Status: Failure detected, Predictive failure | | | |
|   Processor Thermal Margin critical threshold | | | |
|   NIC controller temperature critical threshold | | | |
|   SAS module temperature critical threshold | | | |

TABLE 6-continued

Server Properties Table

| Property | OOB | IB | Use |
|---|---|---|---|
| User Name/Password for BMC access | Y | | Create user credentials for OOB access |
| NIC Firmware update | N | Y | Firmware updates use the NIC drivers |
| SSD firmware update | N | Y | SSD driver dependency |

In examples disclosed herein, example switch properties managed by the HMS 208, 214 are shown in Table 7 below.

TABLE 7

Switch Properties Table

| Property | Use |
|---|---|
| Chassis Serial Number | Identify Inventory |
| Management Port MAC | Network Identity of ToR |
| Management Port IP address | Provide Network Reachability to ToR |
| Port Properties [Num Ports] Admin Status, Link Status, Port Type | Use as input for workload resource requirements |
| Port Statistics | Calculate in-use and free bandwidth and identify choke points using drop counters and buffer statistics |
| OS version | Use for Upgrades |

Further details of the example HMS 208, 214 of FIGS. 2, 3, 4, 5, and/or 6 are disclosed in U.S. patent application Ser. No. 14/788,004, filed on Jun. 30, 2015, and titled "METHODS AND APPARATUS TO CONFIGURE HARDWARE MANAGEMENT SYSTEMS FOR USE IN VIRTUAL SERVER RACK DEPLOYMENTS FOR VIRTUAL COMPUTING ENVIRONMENTS," which is hereby incorporated herein by reference in its entirety.

While an example manner of implementing the example VRM 225, 227 of FIG. 2 is illustrated in FIGS. 4 and 5, one or more of the elements, processes and/or devices illustrated in FIGS. 4 and/or 5 may be combined, divided, re-arranged, omitted, eliminated and/or implemented in any other way. Further, the example workflow services engine 514, the example resource aggregation and correlations engine 516, the example physical resource manager 518, the example logical resource manager 520, the example broadcasting and election manager 522, the example security manager 524, the example asset inventory and license manager 526, the example logical object generation engine 528, the example event process manager 530, the example virtual rack manager directory 532 and/or, more generally, the example VRM 225, 227 of FIGS. 2, 4 and/or 5 may be implemented by hardware, software, firmware and/or any combination of hardware, software and/or firmware. Thus, for example, any of the example workflow services engine 514, the example resource aggregation and correlations engine 516, the example physical resource manager 518, the example logical resource manager 520, the example broadcasting and election manager 522, the example security manager 524, the example asset inventory and license manager 526, the example logical object generation engine 528, the example event process manager 530, the example virtual rack manager directory 532 and/or, more generally, the example VRM 225, 227 of FIGS. 2, 4 and/or 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workflow services engine 514, the example resource aggregation and correlations engine 516, the example physical resource manager 518, the example logical resource manager 520, the example broadcasting and election manager 522, the example security manager 524, the example asset inventory and license manager 526, the example logical object generation engine 528, the example event process manager 530, the example virtual rack manager directory 532 and/or, more generally, the example VRM 225, 227 of FIGS. 2, 4 and/or 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example VRM 225, 227 of FIGS. 2, 4 and/or 5 may include one or more elements, processes and/or devices in addition to, or instead of, those illustrated in FIGS. 4 and/or 5, and/or may include more than one of any or all of the illustrated elements, processes and devices.

Figure 7:
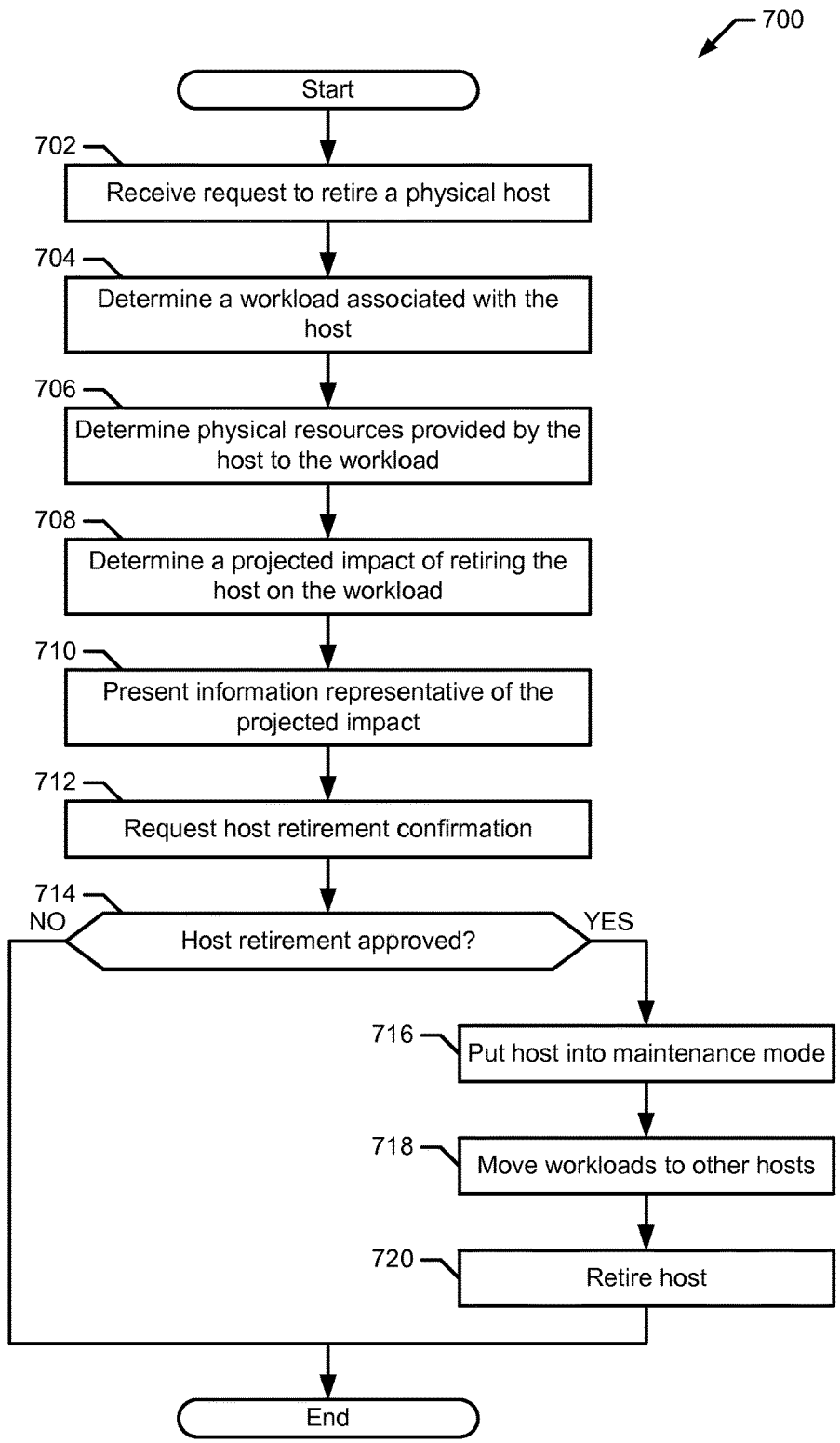
FIGS. 7-9 are flowcharts representative of example machine readable instructions that may be executed to implement aspects of the example VRM of FIGS. 2, 4 and/or 5 to retire hosts in virtual server rack deployments.
Figure 8:
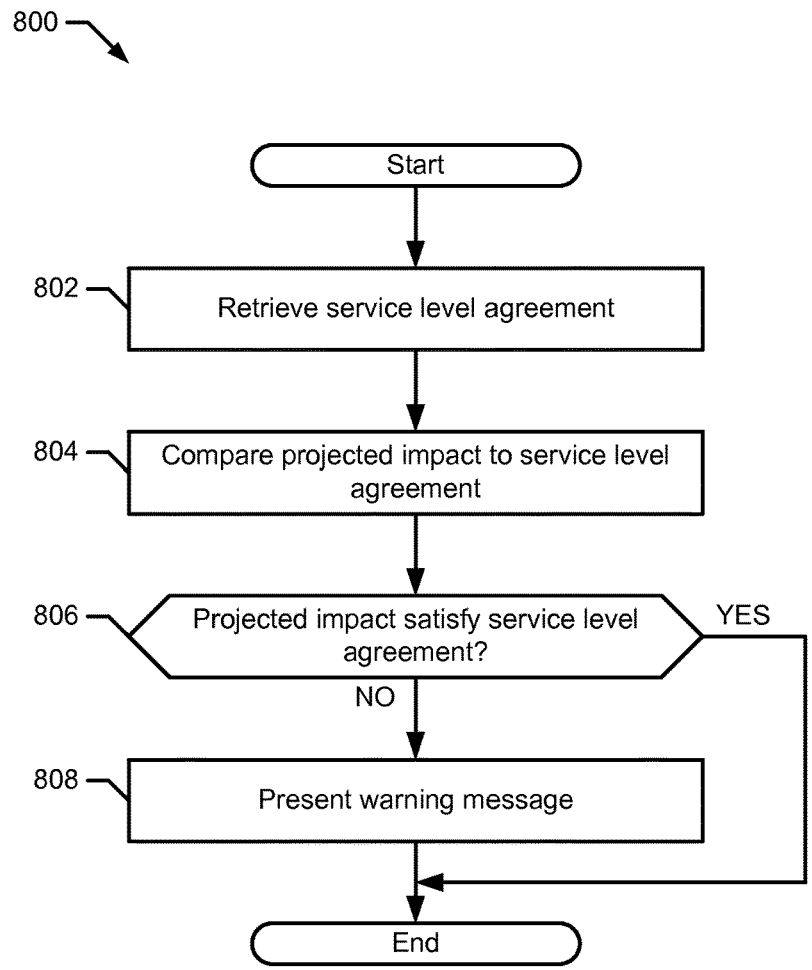
Figure 9:
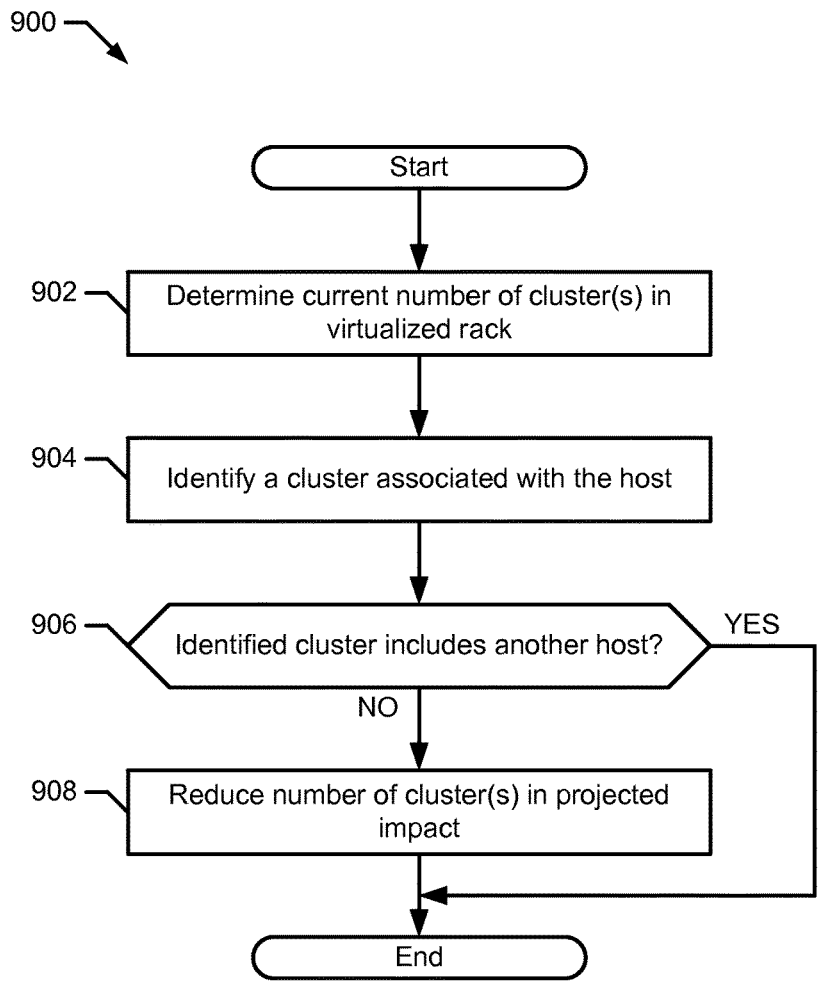

Flowcharts representative of example machine readable instructions for implementing a host retirement process for the VRM 225, 227 of FIGS. 2, 4 and/or 5 are shown in FIGS. 7-9. In these examples, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 7, 8 and/or 9, many other methods of implementing the example VRM 225, 227 may alternatively be used. For example, the order of execution of the blocks may be changed, and/or some of the blocks described may be changed, eliminated, or combined.

As mentioned above, the example processes of FIGS. 7, 8 and/or 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7, 8 and/or 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 7 is a flowchart representative of example machine-readable instructions 700 that may be executed to implement the example VRM 225, 227 of FIGS. 2, 4 and/or 5 to retire a host in virtual server rack deployments for virtual computing environments. For example, the VRM 225, 227 may retire a physical host in a cluster of physical hosts included in the example virtual server rack 206 of FIG. 2 (e.g., one of the example physical hardware resources 224, 226 in the example physical rack 202).

The example instructions 700 of the illustrated example of FIG. 7 begin at block 702 when the example VRM 225, 227 receives a request to retire a physical host (e.g., the physical hardware resources 224, 226) in the virtual server rack 206. For example, an administrator may, via a web page user interface provided by, for example, the vCenter server 510 (FIG. 5), select a physical host to retire (e.g., move offline, remove from the virtual server rack 206, etc.). At block 704, the example VRM 225, 227 determines a workload associated with the selected physical host. For example, the workflow services engine 514 may retrieve a workload profile from the virtual rack manager data store 536 that includes the selected physical host. At block 706, the example VRM 225, 227 determines the physical resources provided by the physical host to the workload. For example, the virtual rack manager directory 532 may retrieve mappings of logical resources to the physical host from the example virtual rack manager data store 536.

At block 708, the example VRM 225, 227 determines a projected impact of retiring the host on the workload. For example, the example resource aggregation and correlations engine 516 may subtract the physical resources provided by the physical host to the workload from the physical resources used to implement the workload. Additionally, the resource aggregation and correlations engine 516 may analyze a service level agreement (SLA), fault tolerance setting, or other setting associated with an entity (e.g., a group of resources referred to as a virtual rack domain (e.g., a group of clusters), a cluster, a cloud, a vCenter cluster, etc.) that contains the host to be retired. For example, an SLA or other setting may indicate a level of redundancy that is required to be maintained (e.g., a workload must be replicated on at least two hosts, a Virtual Rack Domain must include a minimum of three hosts, a workload must be replicated on at least two storage devices, etc.). In such an example, the example resource aggregation and correlations engine 516 may determine if retiring the host will have an impact on meeting or exceeding the SLA or other setting. For example, if an SLA indicates that a cluster of resources must include at least three computing hosts and retiring the computing host would reduce the number of computing hosts to two, the VRM 225, 227 will determine that the plan to retire the host conflicts with the SLA.

At block 710, the example VRM 225, 227 presents information representative of the projected impact of the host retirement. For example, the VRM 225, 227 may provide the vCenter server 510 with a current processing usage, a total remaining processing usage, a current memory usage, a total remaining memory usage, a current network usage and/or a total remaining network usage of the virtual server rack 206 if the selected physical host were retired from the example virtual server rack 206. The example logical resource manager 520 may provide the vCenter server 510 the remaining number of logical resources available for accommodating a workload if the selected physical host were retired from the example virtual server rack 206. Additionally or alternatively, the VRM 225, 227 may present a warning, error, alert, etc. For example, the VRM 225, 227 may present a warning when the VRM 225, 227 determines, in block 708, that retiring the host will conflict with an SLA or other setting. For example, the VRM 225, 227 may warn a user that an SLA or tolerance setting will be disabled, turned off, ignored, etc. if the user proceeds with retiring the host.

At block 712, the example VRM 225, 227 requests confirmation to retire the selected physical host. For example, along with the information representative of the projected impact of the host retirement, the example VRM 225, 227 may include a user interface control to approve or deny the host retirement. If, at block 714, the example VRM 225, 227 determined that the administrator selected not to approve the host retirement (e.g., via a user selection of a deny user interface control), then the example program 700 of FIG. 7 ends. For example, the administrator may determine that the total remaining resources would fail to meet the SLA, and determine not to retire the selected physical host. In some examples, control may return to block 702 to await another request to retire a physical host.

If, at block 714, the example VRM 225, 227 determined that the administrator selected to approve the host retirement (e.g., via a user selection of a approve user interface control), then, at block 716, the example VRM 225, 227 puts the physical host into maintenance mode. For example, the VRM 225, 227 may invoke the maintenance planner service of the OAM layer 406 to dynamically trigger a set of logical operations to relocate virtual machines (VMs) before starting maintenance on a hardware component (e.g., initiating host retirement on the selected host) to increase the likelihood of substantially little or no downtime.

At block 718, the example VRM 225, 227 moves the workloads accommodated by the virtual server rack 206 to another host(s) included in the virtual server rack 206 (e.g., to another host(s) included in the cluster of physical hosts included in the example virtual server rack 206). At block 720, the example VRM 225, 227 retires the host. For example, the VRM 225, 227 may take the host offline by sending a SYS POWER OFF message to the BMCs on board the selected host and may remove the host from the pool of available physical resources. In some examples, where retiring the host conflicts with an SLA, fault tolerance setting, etc. the VRM 225, 227 may also disable or turn off the SLA, fault tolerance setting, etc. as a part of the retiring of the host. The example program 700 of FIG. 7 then ends.

FIG. 8 is a flowchart representative of example machine-readable instructions 800 that may be executed to implement the example VRM 225, 227 of FIGS. 2, 4 and/or 5 to determine whether a projected impact of retiring a physical host in a virtual server rack deployment satisfies a service level agreement. For example, when a physical host is retired (e.g., removed from the example virtual server rack 206), the physical resources provided by the physical host are no longer available for use by the virtual server rack 206. The example VRM 225, 227 weights the projected impact of retiring the physical host against offered SLAs to determine if the logical resources that would be remaining after the physical host is retired continues to meet the SLA.

The example instructions 800 of FIG. 8 may, for example, be implemented as part of block 708 of FIG. 7. The example instructions 800 of the illustrated example of FIG. 8 begin at block 802 when the example VRM 225, 227 retrieves offered service level agreements. For example, the asset inventory and license manager 526 may retrieve an offered SLA from the virtual rack manager data store 536. In some examples, the retrieved SLA may define the capacity requirements, the load requirements, the availability requirements, etc. allocated to executing a workload. For example, an SLA may define that every virtual machine executing a workload have a threshold number of backup virtual machines to increase the likelihood of substantially little or no downtime and/or loss of data. At block 804, the example VRM 225, 227 compares the projected impact of retiring a physical host against the retrieved SLA. For example, the asset inventory and license manager 526 may determine whether the projected remaining logical resources meet the set of requirements and workload characterizations defined in the retrieved SLA. For example, the asset inventory and license manager 526 may determine whether the remaining applications and/or virtual storage area network arrays meet data resiliency policies (e.g., whether the remaining applications and/or virtual storage area network arrays facilitate a threshold number of backup virtual machines for every virtual machine executing the workload), meet a fault tolerance threshold (e.g., a minimum number of replicated hosts that must be present to ensure that the system can survive a fault in a host(s)), etc. If, at block 806, the example asset inventory and license manager 526 determined that the projected impact satisfied the retrieved SLA, then the example program 800 of FIG. 8 ends (e.g., the physical host may then be retired, control may return to block 710 of FIG. 7, etc.).

If, at block 806, the example asset inventory and license manager 526 determined that the projected impact did not satisfy the retrieved SLA, then, at block 808, the VRM 225, 227 presents a warning message. For example, the VRM 225, 227 may present, via a web page user interface, an alert indicative of an unsatisfied SLA, may present information identifying the requirement(s) and/or workload characterization(s) that would not be satisfied following the retirement of the example physical host, etc. The example program of FIG. 8 then ends (e.g., the physical host may then be retired, control may return to block 710 of FIG. 7, etc.).

FIG. 9 is a flowchart representative of example machine-readable instructions 900 that may be executed to implement the example VRM 225, 227 of FIGS. 2, 4 and/or 5 to determine the number of clusters included in a virtual server rack if a physical host in the virtual server rack is retired (e.g., removed from the virtual server rack). The example instructions 900 of FIG. 9 may, for example, be implemented as part of block 708 of FIG. 7.

The example instructions 900 of the illustrated example of FIG. 9 begin at block 902 when the example VRM 225, 227 determines the current number of cluster(s) in a virtualized rack (e.g., the example virtual server rack 206 of FIG. 2). For example, the example asset inventory and license manager 526 may retrieve current state (e.g., configuration) information of the example virtual server rack 206 from the example virtual rack manager data tore 536. At block 904, the example VRM 225, 227 identifies a one of the clusters that is associated with the physical host. For example, the resource aggregation and correlations engine 516 may use the current state information of the virtual server rack 206 to map the physical host to a cluster of physical hosts included in the virtual server rack 206. At block 906, the example VRM 225, 227 determines whether the identified cluster includes another physical host. For example, the example asset inventory and license manager 526 may identify a current number of hosts in the identified cluster. If, at block 906, the example VRM 225, 227 determined that the identified cluster includes another physical host, the example program 900 of FIG. 9 ends (e.g., control may return to block 710 of FIG. 7, etc.).

If, at block 906, the VRM 225, 227 determined that the identified cluster did not include another physical host (e.g., the physical host is the only physical host in the identified cluster), then, at block 908, the example VRM 225, 227 reduces the number of cluster(s) in the virtual server rack 206 (e.g., by one) if the physical host is retired from the virtual server rack 206. In some examples, the example VRM 225, 227 includes the number of cluster(s) in the example virtual server rack 206 in the information representative of the projected impact (e.g., in the information presented in block 710). After the VRM 225, 227 reduces the number of cluster(s) in the virtual server rack 206 at block 908, the example program 900 of FIG. 9 ends (e.g., control may return to block 710 of FIG. 7, etc.).

Figure 10:
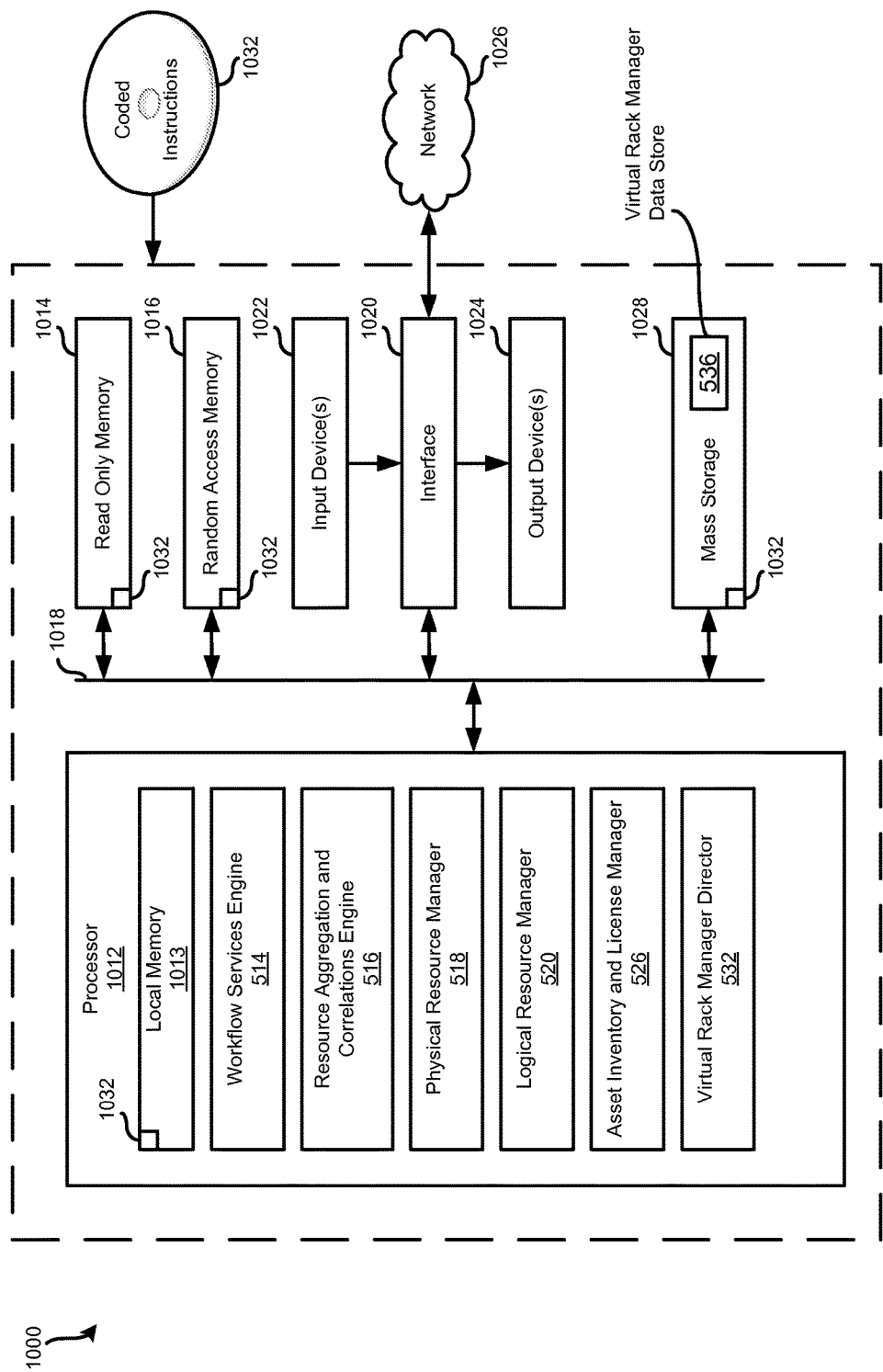
FIG. 10 is a block diagram of an example processing platform capable of executing the example machine-readable instructions of FIGS. 7, 8 and/or 9 to implement the example VRM of FIGS. 2, 4 and/or 5.

FIG. 10 is a block diagram of an example processor platform 1000 capable of executing the instructions of FIGS. 7-9 to implement the VRM 225, 227 of FIGS. 2, 4 and/or 5. The processor platform 1000 can be, for example, a server, a personal computer, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example executes the instructions to implement the example workflow services engine 514, the example resource aggregation and correlations engine 516, the example physical resource manager 518, the example logical resource manager 520, the example asset inventory and license manager 526, the example virtual rack manager directory 532 and/or, more generally, the VRM 225, 227. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives. The example mass storage 1028 implements the example virtual rack manager data store 536.

Coded instructions 1032 representative of the machine-readable instructions of FIGS. 7, 8 and/or 9 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture facilitate the retirement of a physical host in a virtual server rack deployment for a virtual computing environment. The disclosed methods, apparatus and articles of manufacture determine a projected impact of retiring a physical host on workloads being executed by the virtual server rack. In some examples, the disclosed methods, apparatus and articles of manufacture compare the projected impact against offered service level agreements to ensure continued SLA. In some examples, the disclosed methods, apparatus and articles of manufacture reduce computing resources by warning that a physical host retirement will fail to meet SLA, which would cause the workload to have to be moved around to other available hosts to meet SLA.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to retire a physical host, the method comprising:
    determining, via a processor, a workload associated with a first physical host in a virtualized rack in response to a request to retire the first physical host, the workload implemented by a virtual computing environment including the virtualized rack;
    determining, via the processor, a projected impact of retiring the first physical host on the workload;
    determining, via the processor, a number of hosts on which the workload is replicated;
    comparing the number of hosts to a fault tolerance threshold of a service level agreement to determine if the virtual computing environment will satisfy the service level agreement after retiring the first physical host;
    presenting information representative of the projected impact, the information including a warning message when the number of hosts will not satisfy the fault tolerance threshold of the service level agreement; and
    in response to a user request that the first physical host be retired after the warning message is presented:
        triggering a maintenance mode for the first physical host within the virtual computing environment to move virtual machines executing the workload at the first physical host to a second physical host; and
        instructing the first physical host to go offline.

2. A method as defined in claim 1, further comprising powering off the first physical host in response to receiving a confirmation to retire the first physical host after the projected impact is presented.

3. A method as defined in claim 1, wherein the request to retire the first physical host is generated in response to user selection of a user interface control for retiring the first physical host.

4. A method as defined in claim 1, wherein determining the projected impact includes:
    identifying physical resources provided by the first physical host to the workload;
    determining current resources of the virtualized rack allocated to the workload; and
    subtracting the physical resources provided by the first physical host from the current resources to determine the projected impact.

5. A method as defined in claim 4, wherein determining the projected impact includes:
    identifying a current pool of logical resources mapped to the current resources of the virtualized rack; and
    determining a projected pool of logical resources based on a result of subtracting the physical resources provided by the first physical host from the current resources.

6. A method as defined in claim 5, wherein presenting the information representative of the projected impact includes:
    presenting the current pool of logical resources; and
    presenting the projected pool of logical resources.

7. A method as defined in claim 1, wherein determining the projected impact includes:
    determining a current number of virtual computing environments in the virtualized rack;
    identifying a current number of hosts in the virtual computing environment implementing the workload; and
    determining a projected number of virtual computing environments by reducing the current number of virtual computing environments in the virtualized rack when the current number of hosts in the virtual computing environment is one.

8. A method as defined in claim 1, wherein presenting the information representative of the projected impact includes:
    presenting a projected pool of logical resources; and
    presenting a projected number of virtual computing environments in the projected pool.

9. An apparatus to retire a physical host, the apparatus comprising:
a memory storing instructions;
a processor to execute the instructions to implement:
a workflow services engine to determine a workload associated with a first physical host in a virtualized rack in response to a request to retire the first physical host, the workload implemented by a virtual computing environment including the virtualized rack;
a resource aggregation and correlations engine to determine a projected impact of retiring the first physical host on the workload, determine a number of hosts on which the workload is replicated, and compare the number of hosts to a fault tolerance threshold of a service level agreement to determine if the virtual computing environment will satisfy the service level agreement after retiring the first physical host; and
a virtual resource manager to present information representative of the projected impact, the information including a warning message when the number of hosts will not satisfy the fault tolerance threshold of the service level agreement and, in response to a user request that the first physical host be retired after the warning message is presented:
trigger a maintenance mode for the first physical host within the virtual computing environment to move virtual machines executing the workload at the first physical host to a second physical host; and
instruct the first physical host to go offline.

10. An apparatus as defined in claim 9, wherein the virtual resource manager is to power off the first physical host in response to receiving a confirmation to retire the first physical host after the projected impact is presented.

11. An apparatus as defined in claim 9, wherein the virtual resource manager is to receive the request to retire the first physical host in response to user selection of a user interface control for retiring the first physical host.

12. An apparatus as defined in claim 9, wherein the processor is to execute the instructions to implement:
a virtual rack manager directory to identify physical resources provided by the first physical host to the workload;
an asset inventory and license manager to determine current resources of the virtualized rack allocated to the workload; and
the resource aggregation and correlations engine to subtract the physical resources provided by the first physical host from the current resources to determine the projected impact.

13. An apparatus as defined in claim 12, wherein:
the asset inventory and license manager is to identify a current pool of logical resources mapped to the current resources of the virtualized rack; and
the resource aggregation and correlations engine is to determine a projected pool of logical resources based on a result of subtracting the physical resources provided by the first physical host from the current resources.

14. An apparatus as defined in claim 13, wherein the information representative of the projected impact includes the current pool of logical resources and the projected pool of logical resources.

15. An apparatus as defined in claim 9, wherein the virtual resource manager is to present the information representative of the projected impact by:
presenting a projected pool of logical resources; and
presenting a projected number of virtual computing environments in the projected pool.

16. A tangible computer readable storage medium comprising instructions that, when executed, cause a machine to at least:
determine a workload associated with a first physical host in a virtualized rack in response to a request to retire the first physical host, the workload implemented by a virtual computing environment including the virtualized rack;
determine a projected impact of retiring the first physical host on the workload;
determine a number of hosts on which the workload is replicated;
compare the number of hosts to a fault tolerance threshold of a service level agreement to determine if the virtual computing environment will satisfy the service level agreement after retiring the first physical host;
present information representative of the projected impact, the information including a warning message when the number of hosts will not satisfy the fault tolerance threshold of the service level agreement; and
in response to a user request that the first physical host be retired after the warning message is presented:
trigger a maintenance mode for the first physical host within the virtual computing environment to move virtual machines executing the workload at the first physical host to a second physical host; and
instruct the first physical host to go offline.

17. A tangible computer readable medium as defined in claim 16, wherein the instructions, when executed, cause the machine to power off the first physical host in response to receiving a confirmation to retire the first physical host after the projected impact is presented.

18. A tangible computer readable medium as defined in claim 16, wherein the instructions, when executed, cause the machine to generate the request to retire the first physical host in response to user selection of a user interface control for retiring the first physical host.

19. A tangible computer readable medium as defined in claim 16, wherein the instructions, when executed, cause the machine to determine the projected impact by:
identifying physical resources provided by the first physical host to the workload;
determining current resources of the virtualized rack allocated to the workload; and
subtracting the physical resources provided by the first physical host from the current resources to determine the projected impact.

20. A tangible computer readable medium as defined in claim 19, wherein the instructions, when executed, cause the machine to determine the projected impact by:
identifying a current pool of logical resources mapped to the current resources of the virtualized rack; and
determining a projected pool of logical resources based on a result of subtracting the physical resources provided by the first physical host from the current resources.

21. A tangible computer readable medium as defined in claim 20, wherein the instructions, when executed, cause the machine to present the information representative of the projected impact by:
presenting the current pool of logical resources; and
presenting the projected pool of logical resources.

22. A tangible computer readable medium as defined in claim 16, wherein the instructions, when executed, cause the machine to present the information representative of the projected impact by:
presenting a projected pool of logical resources; and
presenting a projected number of virtual computing environments in the projected pool.

* * * * *